US012450817B2

(12) United States Patent
Huang et al.

(10) Patent No.: US 12,450,817 B2
(45) Date of Patent: Oct. 21, 2025

(54) WRAPPING A TWO-DIMENSIONAL (2D) SKETCH ONTO A THREE-DIMENSIONAL (3D) MODEL

(71) Applicant: Dassault Systemes SolidWorks Corporation, Waltham, MA (US)

(72) Inventors: Yunching Huang, Waltham, MA (US); Jody Stiles, Northborough, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 171 days.

(21) Appl. No.: 18/469,652

(22) Filed: Sep. 19, 2023

(65) Prior Publication Data
US 2025/0095271 A1    Mar. 20, 2025

(51) Int. Cl.
*G06T 15/04*       (2011.01)
*G05B 19/19*       (2006.01)

(52) U.S. Cl.
CPC .............. *G06T 15/04* (2013.01); *G05B 19/19* (2013.01); *G06T 2200/24* (2013.01); *G06T 2210/21* (2013.01)

(58) Field of Classification Search
CPC . G06T 15/04; G06T 2200/24; G06T 2210/21; G06T 2219/2021; G06T 17/10; G06T 19/20; G05B 19/19; B33Y 50/00
See application file for complete search history.

(56) References Cited

U.S. PATENT DOCUMENTS

| | | | | |
|---|---|---|---|---|
| 7,061,501 | B1* | 6/2006 | Lake | G06T 15/02 345/473 |
| 7,881,818 | B2* | 2/2011 | Van Bael | G06T 11/001 700/98 |
| 11,893,314 | B2* | 2/2024 | Doganis | G06T 17/20 |
| 2007/0083383 | A1* | 4/2007 | Van Bael | G06F 30/00 715/772 |
| 2013/0066812 | A1* | 3/2013 | Nehme | B29C 64/40 700/106 |
| 2015/0269282 | A1* | 9/2015 | Nelaturi | B33Y 50/02 700/98 |
| 2015/0269290 | A1* | 9/2015 | Nelaturi | G06F 30/20 703/6 |
| 2018/0114368 | A1* | 4/2018 | Marketsmueller | G06F 3/04883 |
| 2018/0268086 | A1* | 9/2018 | Makeig | B29C 64/386 |

(Continued)

OTHER PUBLICATIONS

European Search Report dated Mar. 31, 2025 for EP24201426.4.

(Continued)

*Primary Examiner* — Motilewa Good-Johnson
(74) *Attorney, Agent, or Firm* — Sheehan Phinney Bass & Green PA

(57) ABSTRACT

A computer-based method is disclosed of wrapping a two-dimensional (2D) sketch onto a three-dimensional (3D) model. The method includes placing the 2D sketch onto a 2D grid, transforming the 2D grid to an initial location relative to the 3D model, mapping the 2D grid onto the 3D model to produce a 3D grid wrapped around the 3D model, evaluating the 2D sketch onto the 3D grid to produce a 3D image wrapped around the 3D model, wherein the 3D image wrapped around the 3D model corresponds to (e.g., has a similar appearance to, and was generated from) the 2D sketch, and creating one or more curves on the 3D model by projecting the 3D image onto the 3D model.

28 Claims, 16 Drawing Sheets

(56) References Cited

U.S. PATENT DOCUMENTS

| | | | | |
|---|---|---|---|---|
| 2020/0349758 | A1* | 11/2020 | Paulson | G06T 15/04 |
| 2021/0279957 | A1* | 9/2021 | Eder | G06F 18/2413 |
| 2022/0036651 | A1* | 2/2022 | Davidson | G06T 17/20 |
| 2022/0165025 | A1* | 5/2022 | Lambert | G06T 15/04 |
| 2022/0391553 | A1 | 12/2022 | Zhang et al. | |
| 2023/0290061 | A1* | 9/2023 | Kumar Kamaraju | G06T 7/579 |
| 2023/0306699 | A1* | 9/2023 | Liang | A41H 3/007 |
| 2023/0351650 | A1* | 11/2023 | Savant | G06F 30/12 |
| 2025/0095271 | A1* | 3/2025 | Huang | G05B 19/19 |

OTHER PUBLICATIONS

Ryo Suzuki et al: "Autocomplete Textures 1-15 INV. for 3D Printing", G06T17/20 arxiv.org, Cornell University Library, 201 Olin Library Cornell University Ithaca, NY 14853, Mar. 16, 2017.

* cited by examiner

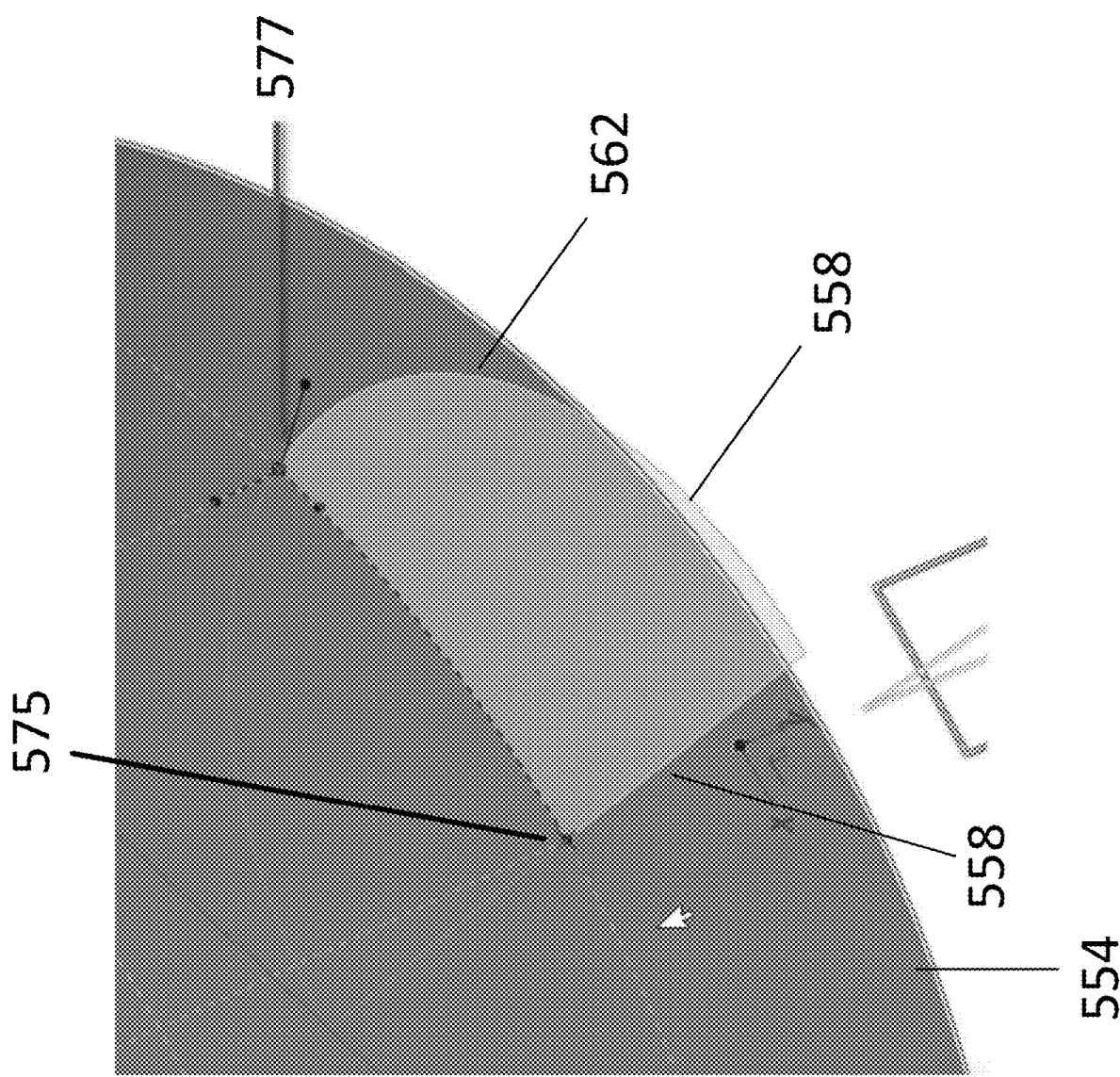

WRAPPING A TWO-DIMENSIONAL (2D) SKETCH ONTO A THREE-DIMENSIONAL (3D) MODEL

FIELD OF THE INVENTION

This disclosure relates to the field of computer-implemented design and modeling, and more particularly, relates to wrapping a two-dimensional (2D) sketch onto a three-dimensional (3D) model in a computer implemented environment.

BACKGROUND

Computer-aided design (CAD) software can facilitate the design of a great many objects. Wrapping, in the context of a CAD system, refers to an operation that enables adding or removing material to a part by projecting a sketch around a surface. Wrapping has become increasingly important for product design systems to remain competitive. Current wrapping systems and techniques, however, have limitations.

SUMMARY OF THE INVENTION

In one aspect, a computer-based method is disclosed of wrapping a two-dimensional (2D) sketch onto a three-dimensional (3D) model. The method includes placing the 2D sketch onto a 2D grid, transforming the 2D grid to an initial location relative to the 3D model, mapping the 2D grid onto the 3D model to produce a 3D grid wrapped around the 3D model, evaluating the 2D sketch onto the 3D grid to produce a 3D image wrapped around the 3D model, wherein the 3D image wrapped around the 3D model corresponds to (e.g., has a similar appearance to, and was generated from) the 2D sketch, and creating one or more curves on the 3D model by projecting the 3D image onto the 3D model. More specifically, in a typical implementation, the 3D image wrapped around the 3D model is mapped onto a 3D mesh wrapped around the 3D model that was generated from the 2D grid. Moreover, in a typical implementation, mapping the 2D grid onto the 3D model to produce the 3D grid on the 3D model includes applying a marching algorithm to the 3D model to map the 2D grid onto the 3D model one grid at a time.

In another aspect, a computer system includes a computer processor; and computer-based memory operatively coupled to the computer processor. The computer-based memory stores computer-readable instructions that, when executed by the computer processor, cause the computer-based system to wrap a two-dimensional (2D) sketch onto a three-dimensional (3D) model with a process. The process includes placing the 2D sketch onto a 2D grid; transforming the 2D grid to an initial location relative to the 3D model; mapping the 2D grid onto the 3D model to produce a 3D grid wrapped around the 3D model; evaluating the 2D sketch onto the 3D grid to produce a 3D image wrapped around the 3D model, wherein the 3D image wrapped around the 3D model corresponds to (e.g., has a similar appearance to, and was generated from) the 2D sketch; and creating one or more curves on the 3D model by projecting the 3D image onto the 3D model. More specifically, in a typical implementation, the 3D image wrapped around the 3D model is mapped onto a 3D mesh wrapped around the 3D model that was generated from the 2D grid. Moreover, in a typical implementation, mapping the 2D grid onto the 3D model to produce the 3D grid on the 3D model includes applying a marching algorithm to the 3D model to map the 2D grid onto the 3D model one grid at a time.

In yet another aspect, a non-transitory computer readable medium having stored thereon computer-readable instructions that, when executed by a computer-based processor, cause the computer-based processor to: place the 2D sketch onto a 2D grid, transform the 2D grid to an initial location relative to the 3D model, map the 2D grid onto the 3D model to produce a 3D grid wrapped around the 3D model, evaluate the 2D sketch onto the 3D grid to produce a 3D image wrapped around the 3D model, wherein the 3D image wrapped around the 3D model corresponds to (e.g., has a similar appearance to, and was generated from) the 2D sketch, and creating one or more curves on the 3D model by projecting the 3D image onto the 3D model. More specifically, in a typical implementation, the 3D image wrapped around the 3D model is mapped onto a 3D mesh wrapped around the 3D model that was generated from the 2D grid. Moreover, in a typical implementation, mapping the 2D grid onto the 3D model to produce the 3D grid on the 3D model includes applying a marching algorithm to the 3D model to map the 2D grid onto the 3D model one grid at a time.

In some implementations, one or more of the following advantages are present.

For example, in various implementations, the wrapping systems and techniques disclosed herein solve one of more limitations associated with prior wrapping techniques. Moreover, the implementations of the wrapping systems and techniques result in high quality results and provide a solution that can be applied to any type of model with high surface continuity and accuracy. Implementations of the systems and techniques disclosed herein are also highly efficient because they do not require flattening an entire model. With prior techniques, flattening of non-analytical surfaces could result in increasing deformation as the flattening process expands from the starting location. Removing the initial flattening requirement means that the target faces are no longer distorted before the tool (or 2D version of a sketch) is applied. Distortion of the tool is still possible and tends to increase with distance from the starting location, but this effect is reduced.

In a typical implementation, the wrapping systems and techniques disclosed herein help facilitate efficient and effective product design and are expected to be highly desirable from a competitive perspective. The current methods of performing a wrap operation are fairly consistent across different applications with various behaviors and limitations. Implementations of the wrap systems and techniques disclosed herein provide a new approach that reduces and/or removes some of the existing limitations.

Instead of flattening the target model, for example, the wrapping systems and techniques disclosed herein transforms a 2D sketch directly onto the target model, hence there is no time-consuming flattening process nor limitation of what type of surface, analytical or not, that the system and techniques can apply to. By providing a single approach to wrapping, implementations of the systems and techniques disclosed herein may reduce the trial-and-error approach required by existing approaches, making the entire process easier for the user.

Moreover, advantageously, the systems and techniques disclosed herein, including the wrapping algorithm disclosed herein, can be applied to any geometry virtually without limitation, e.g., the target geometry can be primitives or general B-Spline models. The wrapping algorithm is also efficient because it does not require preprocessing of the target model. Moreover, its resolution (determined by the density of the mapping grid) can be optimized.

Other features and advantages will be apparent from the description and drawings, and from the claims.

BRIEF DESCRIPTION OF THE DRAWINGS

FIGS. 5A-5H are screenshots and images that represent exemplary aspects of the process represented in the FIG. 4 flowchart.

Like reference characters refer to like elements.

DETAILED DESCRIPTION

Figure 1:
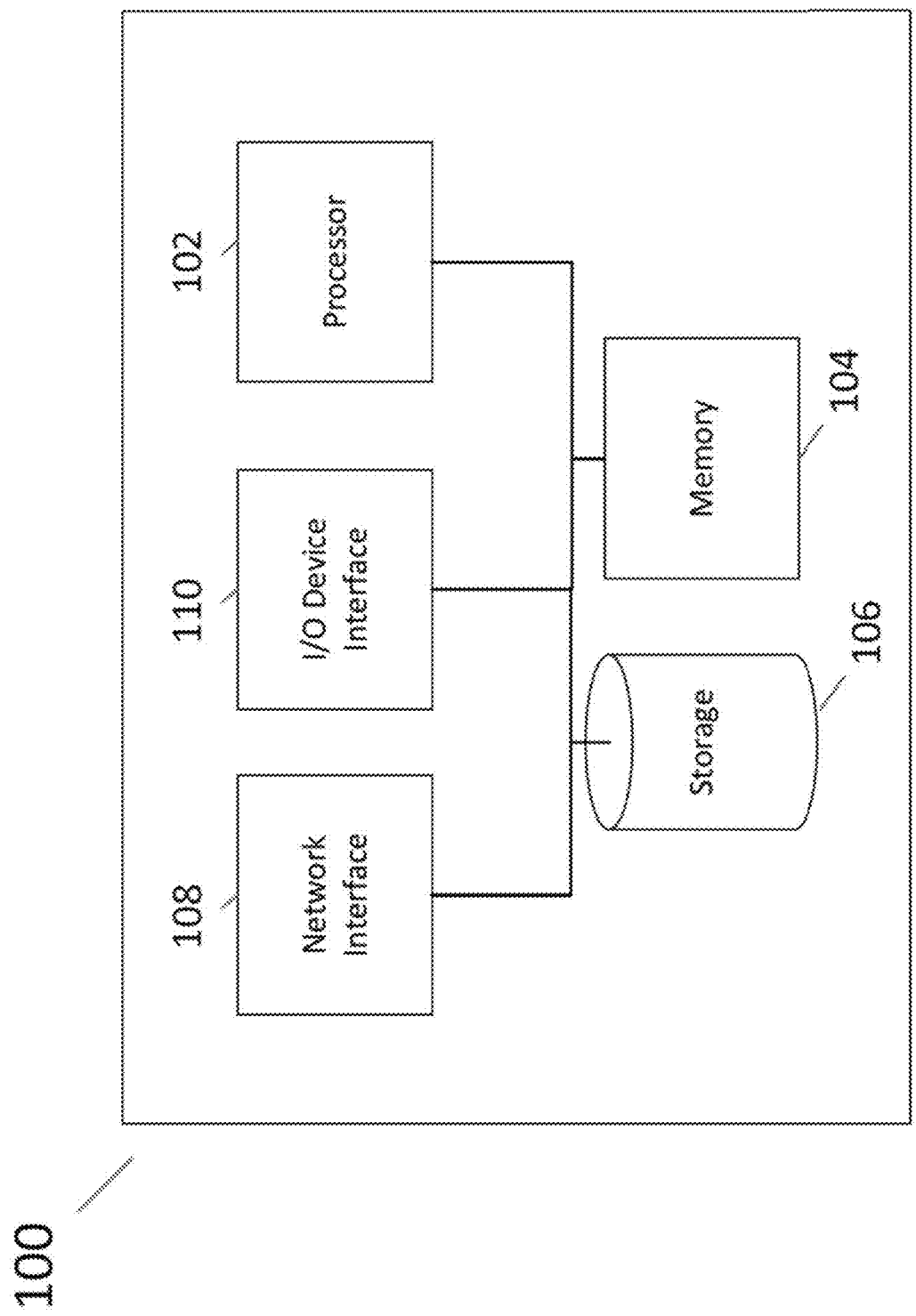
FIG. 1 is a schematic representation of a computer for implementing and facilitating the techniques disclosed herein associated with wrapping a 2D sketch around a 3D model in a computer-implemented environment.

This document uses a variety of terminology to describe its inventive concepts. This terminology should be given its ordinary meaning and, unless otherwise indicated, may be understood as having meanings that are consistent with what follows.

For example, computer-aided design (CAD) software allows a user to construct and manipulate complex three-dimensional (3D) models. SOLIDWORKS® computer software and CATIA® computer software, both of which are available from Dassault Systèmes, the applicant of the current application, are examples of CAD software that may be used, for example, to construct and manipulate complex three-dimensional (3D) models. A "design engineer" is a typical user of a 3D CAD system. The design engineer typically designs physical and aesthetic aspects of 3D models and may be skilled in 3D modeling techniques. The design engineer typically creates parts and may assemble certain parts into a subassembly. A subassembly may also consist of other subassemblies. An assembly may be designed using parts and subassemblies. Parts and subassemblies may be collectively referred to as components. The phrase "design engineer" used herein should be construed broadly to include any one or more human users of a computer or computer system implementing the wrapping techniques disclosed herein.

The term "wrapping" refers to a computer-implemented method whereby a 2D sketch, for example, is transformed or applied onto a 3D model, for example. More specifically, a 2D image represented in the 2D sketch is transformed or applied onto one or more three dimensional surfaces of the 3D model.

The phrase "2D sketch," as used herein, refers to a computer-based representation of an image that lies entirely within a single plane. The image may be, for example, a stylized visual representation of a company name, a product name, or a visual representation of an ornamental or functional aspect of a product, or any other feature(s), pattern(s), word(s), phrase(s), design(s), etc. It may consist of curves, shapes, letters, numbers, symbol, sequences thereof, etc. To emphasize, the image on each 2D sketch is restricted to two dimensions and two dimensions only. No portion of the image on the 2D sketch extends beyond or outside those two dimensions (or the one and only one plane). A 2D sketch may be created, for example, using a Sketching functionality, which is available, for example, in the SOLIDWORKS® computer program. 2D sketches may be stored in computer-based memory.

The phrase "3D model," as used herein, refers to a computer-based representation of a three-dimensional real-world object or a portion thereof. A number of different computer-based modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. CAD systems may combine solid modeling and other modeling techniques, such as parametric modeling techniques. Parametric modeling techniques can be used to define various parameters for different features and components of a model, and to define relationships between those features and components based on relationships between the various parameters. Other computer-based modeling techniques may be used as well. 3D models may be stored in computer-based memory.

A "face" is to a selectable area (planar or otherwise) in a model or surface with boundaries that helps define the shape of the model or surface. For example, a rectangular solid has six faces, and a cylindrical solid has three faces. The phrase "target face" (or "target surface") refers to the face (or faces) of a 3D model onto which a 2D sketch gets wrapped or is to be wrapped.

"Scribing," "embossing" and "debossing" (and the like) refer to exemplary manufacturing processes that can produce a visual appearance of a pattern on a modeled object. More specifically, "scribing" creates an imprint on the object, "embossing" creates a raised feature on the object, and "debossing" creates an indented feature on the face. In a typical implementation, CAD software provides access to functionalities that enables a design engineer to select between scribing, embossing, debossing, and/or otherwise forming a visual impression of a formerly two dimensional sketch that has been wrapped onto a 3D model so that when a real-world version of the 3D modeled object is manufactured (e.g., in a real world manufacturing machine, that may include additive technology or substrative technology, such as a computer numerical control ("CNC") machine). The real-world manufactured version of the 3D modelled object will include a scribed, embossed, debossed, or otherwise visually apparent pattern on one or more surfaces thereof that looks like a wrapped version of the 2D sketch, wrapped onto one or more 3D surfaces of the real-world object.

A "developable" surface is a surface (e.g., on a 3D model) that has a geometric shape such as a cone, a cylinder that can be flattened onto a plane without becoming distorted. A "non-developable" surface, in contrast, is a surface (e.g., on a 3D model) that has a geometric shape such as a sphere, a helicoid, or a hyperbolic paraboloid that deforms when flattened onto a plane.

"Orthogonal projection" refers to a computer-implemented process by which a 3D model, for example, may be represented in two dimensions by projecting the three-dimensional object onto a two-dimensional projection plane. Orthogonal projection is a form of parallel projection in which all the projection lines are orthogonal to the projection plane. "Directional projection" refers to a computer-implemented process of representing a 3D model, for example, in two dimensions by projecting the three-dimensional object onto a projection plane where the projections lines are not necessarily orthogonal to the projection place. Orthogonal projection is a type of directional projection, where the projection lines are orthogonal to the projection plane.

The phrase "processor" (or the like refers) to any one or more computer-based processing devices. A computer-based processing device is a physical component (e.g., a CPU) that can perform computer functionalities by executing computer-readable instructions stored in memory. If there is more than one computer-based processing device or processor cores, they can be contained in a single physical device (e.g., in a single a computer or server) or distributed across multiple physical devices that may be located, for example, in more than one physical location or facility.

The phrase "memory" (or the like) refers to any one or more computer-based memory devices. A computer-based memory device is a physical component that can store computer-readable instructions that, when executed by a processor, results in the processor performing associated computer functionalities. If there is more than one computer-based memory device, they can be contained in a single physical device (e.g., a computer or server) or distributed across multiple physical devices that may be in more than one physical location or facility.

The phrase "computer numerical control" or "CNC" refers to the automatic control of one or more machining tools, such as lathes, drills, grinders, routers, mills, 3D printers, etc. by means of a computer. A "CNC machine" is a machine that includes one or more such machining tools and that is configured to process a piece of material (e.g., metal, plastic, ceramic, wood, composite, etc.) to meet specifications by following coded programmed instructions and without a manual operator directly controlling the machining operation. Instructions may be delivered to a CNC machine from a computer in the form of a sequential program of machine control instructions, and then executed by the CNC machine. In some instances, the program may have been generated by or from CAD software and/or computer-aided manufacturing ("CAM") software (e.g., based on a model that was generated using the CAD/CAM software). In such instances, the object's mechanical dimensions, for example, may have been defined using the CAD software and then translated into manufacturing directives (e.g., by corresponding CAM software). The resulting directives may be utilized as (or to provide) CNC-compatible commands necessary for a particular CNC machine to perform manufacturing operations in connection with producing a real-world version of the object. The CNC-compatible commands may be loaded into and executed by the CNC machine to perform real-world manufacturing operations (e.g., subtractive operations) on one or more pieces of material (e.g., metal, plastic, ceramic, wood, composite, etc.).

Three-dimensional (3D) printers are real world additive manufacturing machines that are adapted to construct a real world, 3D object from a CAD model or a digital 3D model. 3D printers can utilize a variety of different types of processes in which material is deposited, joined, or solidified (e.g., under computer control), with the material being added together (such as plastics, liquids or powder grains being fused), typically in a layer by layer manner.

Prior Technologies are Distinct

Prior technologies exist for wrapping in computer-aided design. For example, certain prior CAD software have wrap functionalities. However, there are technical limitations and/or problems associated with the prior CAD software that implementations of the systems and techniques disclosed herein may address and overcome.

Figure 2A:
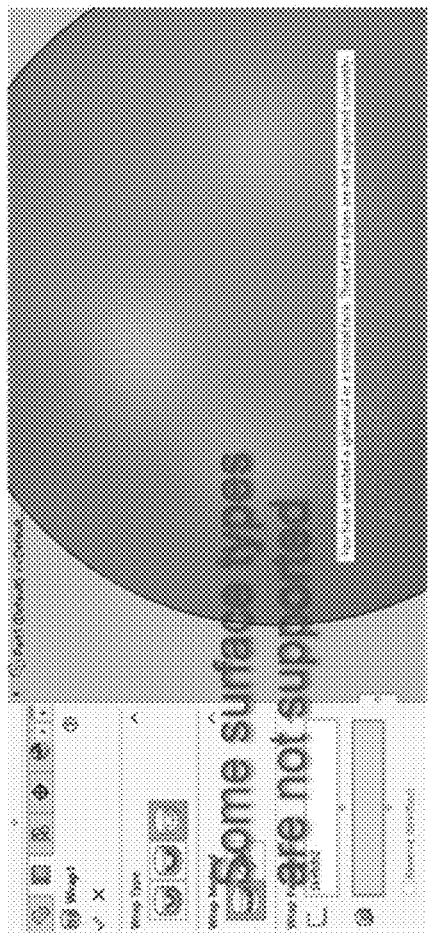
FIGS. 2A-2D are screenshots and images representing shortcomings associated with prior wrapping techniques.

For example, the labeled screenshot in FIG. 2A points out that certain prior CAD software does not support wrapping onto certain types of surfaces. Specifically, wrapping may not be available onto surfaces, such as spherical or toroidal faces, that cannot be easily flattened. These can include, for example, various types of non-developable surfaces.

Figure 2B:
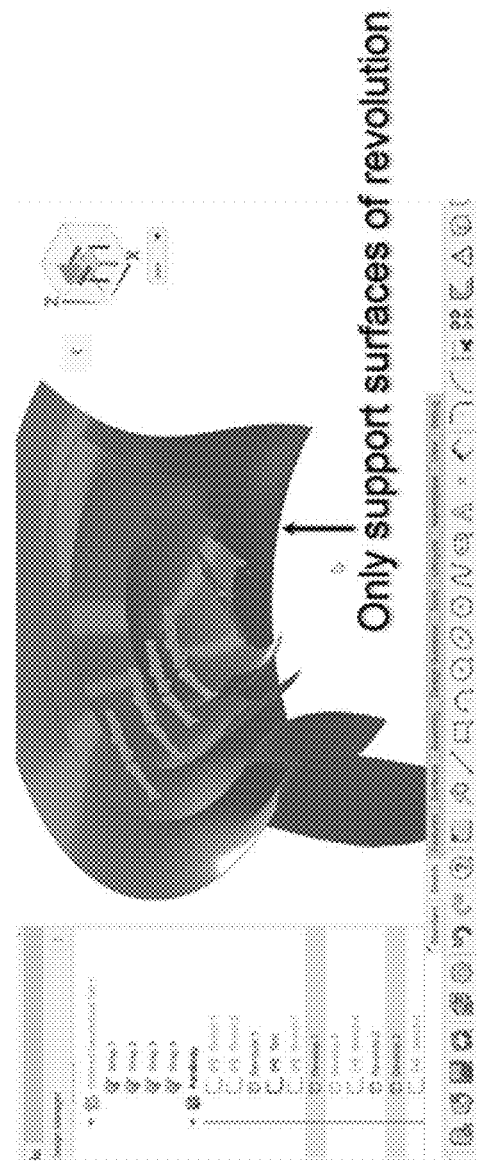

The labeled screenshot in FIG. 2B points out that certain prior CAD software only supports surfaces of revolution. The phrase "surface of revolution" refers here to a surface (e.g., in Euclidian space) created by rotating a curve around an axis of rotation.

Figure 2C:
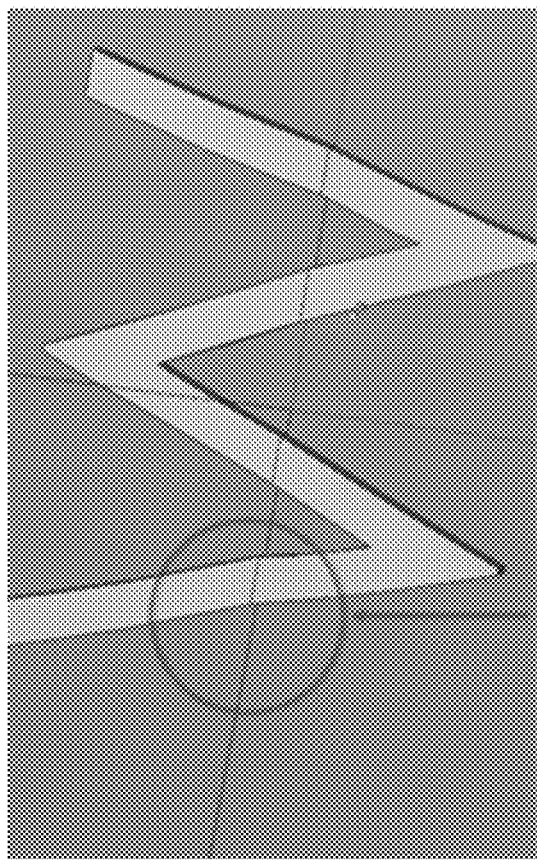

The labeled screenshot in FIG. 2C points out that certain prior CAD software produces results that lack smoothness. Specifically, as shown, one of the line segments that form the letter "W" in the illustrated screenshot bends undesirably producing a warped "W" on the object.

Figure 2D:
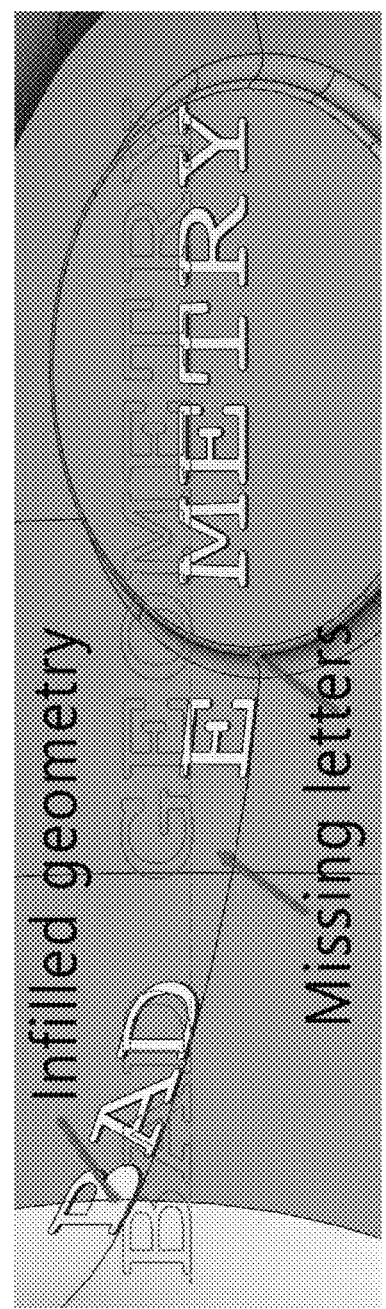

Finally, the labeled screenshot in FIG. 2D shows that certain prior CAD software produces results with infilled or missing geometries (e.g., missing letters or other characters). Specifically, in the illustrated example, the characters "G" and "O" are missing from the word "GEOMETRY," resulting in the incomplete and incorrect pattern on the object that reads "E METRY." Also, in the illustrated example, the bottom portion of the letter "B" in the word "BAD" is infilled.

In various implementations, the systems and techniques disclosed herein (in contrast to the prior systems) provide technical solutions to these, and potentially other, technical limitations/problems in prior CAD software.

For example, in various implementations, the systems and techniques disclosed herein may be utilized regardless of whether the target surface is developable, non-developable or non-analytical surfaces. Additionally, in various implementations, the techniques and systems disclosed herein may apply, reliably, to any number of surface types, and are not generally limited to surfaces of revolution or any other kind of surface. In some implementations, the resulting features are formed in the 3D model and resulting real world product more reliably and with less distortion.

Technical Disclosure

FIG. 1 is a schematic representation of an exemplary computer 100 that enables a design engineer to wrap a two-dimensional (2D) sketch onto a three-dimensional (3D) model in a computer implemented environment (e.g., within a CAD program). In various implementations, the computer 100 performs its wrapping functionalities in a user-friendly, reliable, and effective manner. Moreover, it has been found that the computer 100, in various implementations utilizing techniques disclosed herein, performs the wrapping functionalities in a manner that overcomes or addresses certain technical limitations and problems that exist in prior CAD software. For example, in various implementations, the computer 100 can wrap a 2D sketch onto a wide variety of different surface types, some of which may not be supported by prior CAD software. As another example, in various implementations, computer 100 can wrap a 2D sketch to produce smooth results, even at low resolutions, on the 3D model, which, ultimately, translates to smooth results on a real-world object manufactured from the 3D model. Additionally, in various implementations, the computer 100 can perform wrapping without a significant risk of missing geometries from the 2D sketch being wrapped. The computer 100, therefore, tends to produce results (e.g., a design) on the 3D model (and resulting real-world object manufactured from the 3D model) that are complete and correct. Other technical advantages may be realized as well by utilizing computer 100 to wrap a 2D sketch onto one or more surfaces of a 3D model.

The computer 100 also typically enables the design engineer to specify how the pattern resulting from the 2D sketch wrapped onto the 3D model is to be formed on the modeled object. Options in this regard may include one or more of inscribing, embossing, and debossing. The computer 100, in a typical implementation, applies a set of curves coincident with the target face(s) that correspond to the wrapped 2D sketch. The computer 100 then updates the 3D model accordingly to add three dimensional contours to the target face(s) of the 3D model that correspond to the applied set of curves. The specific parameters of the added three-dimensional contours may depend on the selected formation technique.

Once the 3D model is complete, the 3D model may be used to manufacture a real-world object based on the 3D model. In this regard, the computer 100 may be utilized to provide one or more technical drawings for a human to use in connection with manufacturing the real-world object. The human may then enter instructions into a real-world manufacturing machine to manufacture a real-world object based on the 3D model and/or technical drawing(s). Additionally, or alternatively, the computer 100, in some instances, may be configured to provide information about the 3D model, in the form of machine-executable instructions to one or more machines (e.g., a CNC machine) to manufacture a real-world version of the object. The one or more machines may then manufacture the real-world version of the object in accordance with the instructions.

Referring again to FIG. 1, the computer 100 has a processor 102, computer-based memory 104, computer-based storage 106, a network interface 108, an input/output device interface 110, and a bus that serves as an interconnect between the components of the computer 100. The bus acts as a communication medium over which the various components of the computer 100 can communicate and interact with one another.

The processor 102 is configured to perform the various computer-based functionalities disclosed herein as well as other supporting functionalities not explicitly disclosed herein. Some such functionalities include facilitating the wrapping functionalities disclosed herein. Typically, the processor 102, together with other computer components, performs these, and other, functionalities by executing computer-readable instructions stored on a computer-readable medium (e.g., in 104, 106, or elsewhere). In various implementations, some of these functionalities may be performed with reference to data stored in the computer-readable medium and/or received from some external source (e.g., an input/output (I/O) device via the I/O device interface 110 and/or from an external network via the network interface 108).

The computer 100 has volatile and non-volatile memory. More specifically, in a typical implementation, memory 104 provides a form of volatile storage storing computer-readable instructions that, when executed by the processor 102, cause the processor 102 to perform or facilitate performance of some (or all) of the computer-based functionalities disclosed herein. Moreover, in a typical implementation, storage 106 provides a form of non-volatile memory storing computer-readable instructions, such as instructions to implement an operating system, configuration information, etc. The various system memory resources (e.g., 104, 106) may store data to support computer functionalities disclosed herein and otherwise, as well.

In a typical implementation, memory 104 stores the computer-readable instructions that, when executed by the processor 102, cause the processor 102 to perform functionalities that present to a user at the computer 100 a computer-aided design program, with the functionalities disclosed herein, including the wrapping functionalities, incorporated therein. Examples of computer-aided design platforms suitable for adapting to incorporate the functionalities disclosed herein is the SOLIDWORKS® or CATIA® computer programs, which are available from Dassault Systèmes Corporation, the applicant of the current application. Implementations of the computer-aided design program, so adapted, would include one or more (or all) the wrapping functionalities disclosed herein.

The network interface 108 is a component that enables the computer 100 to connect to any one or more of a variety of external computer-based communications networks, including, for example, local area networks (LANs), wide area networks (WANs), such as the Internet, or the like. In various implementations, the network interface 108 can be implemented in hardware, software, or a combination of hardware and software. In some implementations, the network interface (or other interface) may provide a connection to other external machinery (e.g., one or more CNC machines, etc.).

The input/output (I/O) device interface 110 is a component that enables the computer 100 to interface with any one or more input or output devices, such as a keyboard, mouse, display, microphone, speakers, printers, etc. In various implementations, the I/O device interface can be implemented in hardware, software, or a combination of hardware and software. In a typical implementation, the computer may include one or more I/O devices (e.g., a computer screen, keyboard, mouse, printer, touch screen device, etc.) connected to the I/O device interface 110. These I/O devices (not shown in FIG. 1) act as human-machine-interfaces (HMIs) and are generally configured enable a human user to interact with the computer 100 to access and utilize functionalities, particularly those related to computer-aided design.

In an exemplary implementation, the computer 100 is connected to a display device (e.g., via the I/O device interface 110) and configured to present at the display device a visual representation of an interface to a product design environment, such as the one provided by and within the SolidWorks® computer program. The interface and its visual representation on the computer-based display device, in a typical implementation, provides the user with access to the wrapping functionalities disclosed herein, and displays (e.g., on a display device coupled to the I/O device interface 110) a visual representation of the 2D sketches, 3D models, combined 2D sketch/3D models, screenshots, etc.

In some implementations, the computer 100 and its various components may be contained in a single housing (e.g., as in a personal laptop) or at a single workstation. In some implementations, the computer 100 and its various components may be distributed across multiple housings, perhaps in multiple locations across a network. Each component of the computer 100 may include multiple versions of that component, possibly working in concert, and those multiple versions may be in different physical locations and connected via a network. For example, processor 102 in FIG. 1 may represent multiple discrete processors in different physical locations working together to perform processes attributable to processor 102 in a coordinated manner. A wide variety of possibilities regarding specific physical implementations are possible.

In various implementations, the computer 100 may have additional elements not shown in FIG. 1. These can include, for example, controllers, buffers (caches), drivers, repeaters, receivers, a graphics processing unit (GPU), etc. Furthermore, the interfaces (e.g., 108, 110) may include elements not specifically represented in FIG. 1, including, for example, address, control, and/or data connections to facilitate communications between the illustrated computer components.

In various implementations, the computer 100 may host, not only a CAD (or other) program that includes the wrapping functionalities disclosed herein, but also may host other programs, such as CAM programs, that can be used in conjunction with the CAD program (e.g., to facilitate generating machine-readable instructions for an external CNC machine that get transmitted to the external CNC machine via the network interface 108, for example.

FIGS. 3A-3D show examples of 2D sketches, the 2D sketches wrapped onto 3D models, and resulting, manufactured, real world objects based on the 3D models with the wrapped 2D sketches. These figures represent examples of results that can be achieved in applying the systems and techniques disclosed herein. More specifically, they show that the systems and techniques are effective on a wide range of target geometries (on the 3D model and on the resulting real-world object). For example, the systems and techniques have been shown to be effective whether the target geometry is a primitive (e.g., a cube, cylinder, sphere, cone, pyramid, or torus) or any other simple or more complex shape (e.g., a general B-spline model).

Figure 3A:
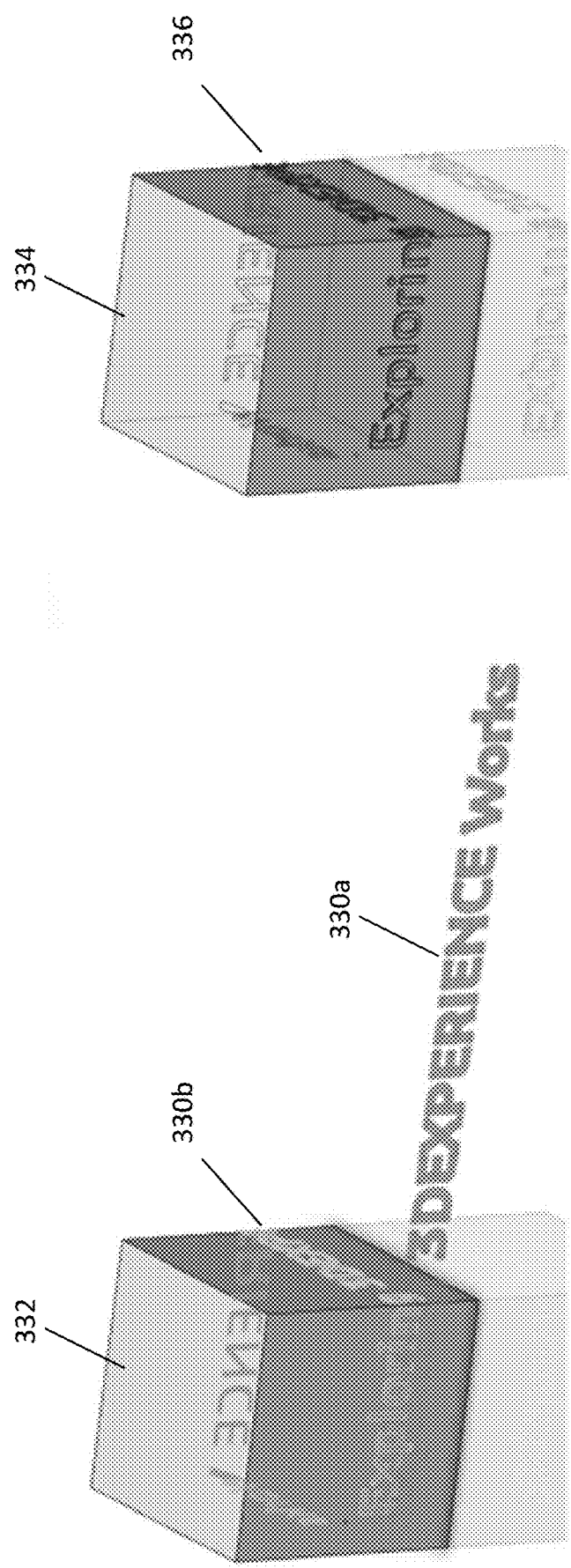
FIGS. 3A-3D are examples of sketches having been wrapped onto 3D objects.

FIG. 3A, for example, shows a schematic representation of an exemplary 2D sketch 330a that reads "Exploring 3DEXPERIENCE Works" and an exemplary 3D model 332 in the form of a cube that includes a wrapped version 330b of the original 2D sketch 330a. The 3D model 332 appears partially transparent in the figure. This transparency is merely to illustrate how, in the illustrated example, the wrapped version 330b of the 2D sketch wraps around the 3D model such that part of the wrapped version 330b of the 2D sketch appears on multiple different surfaces of the 3D model. Specifically, part of the wrapped version 330b of the 2D sketch appears on four different side surfaces of the cubic 3D model. Specifically, "Explorin" appears on a first side surface of the cubic 3D model 332, "g 3D EXP" appears on a second side surface of the cubic 3D model 332, "ERIENCE," appears on a third side surface of the cubic 3D model 332, and "Works" appears on a fourth side surface of the cubic 3D model 332. It is apparent that, in the illustrated example, the wrapped version 330b of the 2D sketch occupies three dimensions (not just two).

The real-world object, manufactured from the 3D model 332 with the wrapped version 330b of the 2D sketch, is a physical three-dimensional cube 334, on which an image that corresponds to the wrapped version 330b of the 2D sketch appears. In an exemplary implementation, the physical three-dimensional cube 334, on which an image 336 that corresponds to the wrapped version 330b of the 2D sketch appears may be manufactured with a CNC machine, for example, executing machine instructions generated from the 3D model 332 with the wrapped version 330b of the 2D sketch. The cube 334 appears partially transparent in the figure. This transparency illustrates how, in the illustrated example, the image 336 that corresponds to the wrapped version 330b of the 2D sketch wraps around the 3D model such that, as in the 3D model 332, a different part of the image 336 appears on multiple different surfaces of the 3D model. Depending on specifications that may have been provided by a design engineer, for example, the image may have been formed, with the CNC machine for example, by embossing, debossing, or otherwise forming the indicated visual impression on the outer surfaces of the cube 334.

Figure 3B:
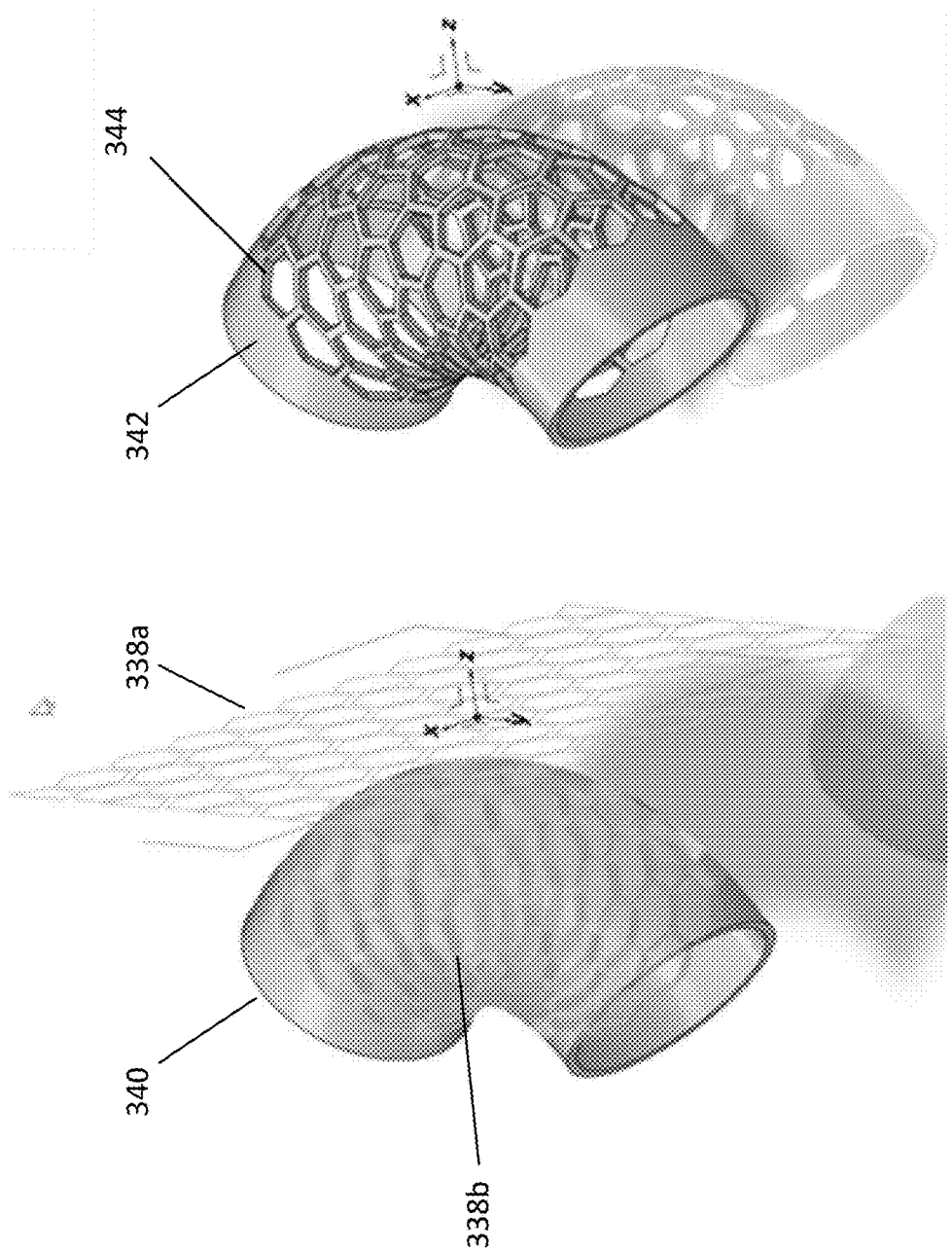

FIG. 3B shows a schematic representation of another exemplary 2D sketch 338a that is an array of hexagonal cells, an exemplary 3D model 340 in the form of an elbow-shaped tube that includes a wrapped version 338b of the original 2D sketch 338a. The 3D model 340 appears partially transparent in the figure. This transparency illustrates how, in the illustrated example, the wrapped version 338b of the 2D sketch wraps around a large part of the outer tubular surface of the 3D model between the ends thereof. It is apparent that, in the illustrated example, the wrapped version 330b of the 2D sketch occupies three dimensions (not just two).

The real-world object, manufactured from the 3D model 340 with the wrapped version 338b of the 2D sketch, is a physical three-dimensional elbow-shaped tube 342, on which an array of hexagonal holes, matching the same array represented by the wrapped version 338b of the 2D sketch on the 3D model, exists. In an exemplary implementation, the physical three-dimensional object 342 may have been manufactured with a CNC machine, for example, executing machine instructions generated from the 3D model 340 with the wrapped version 338b of the 2D sketch, directly. Depending on specifications that may have been provided by a design engineer, for example, the array of holes 344 may have been formed, with the CNC machine for example, by debossing, or otherwise forming the indicated pattern in object 342.

Figure 3C:
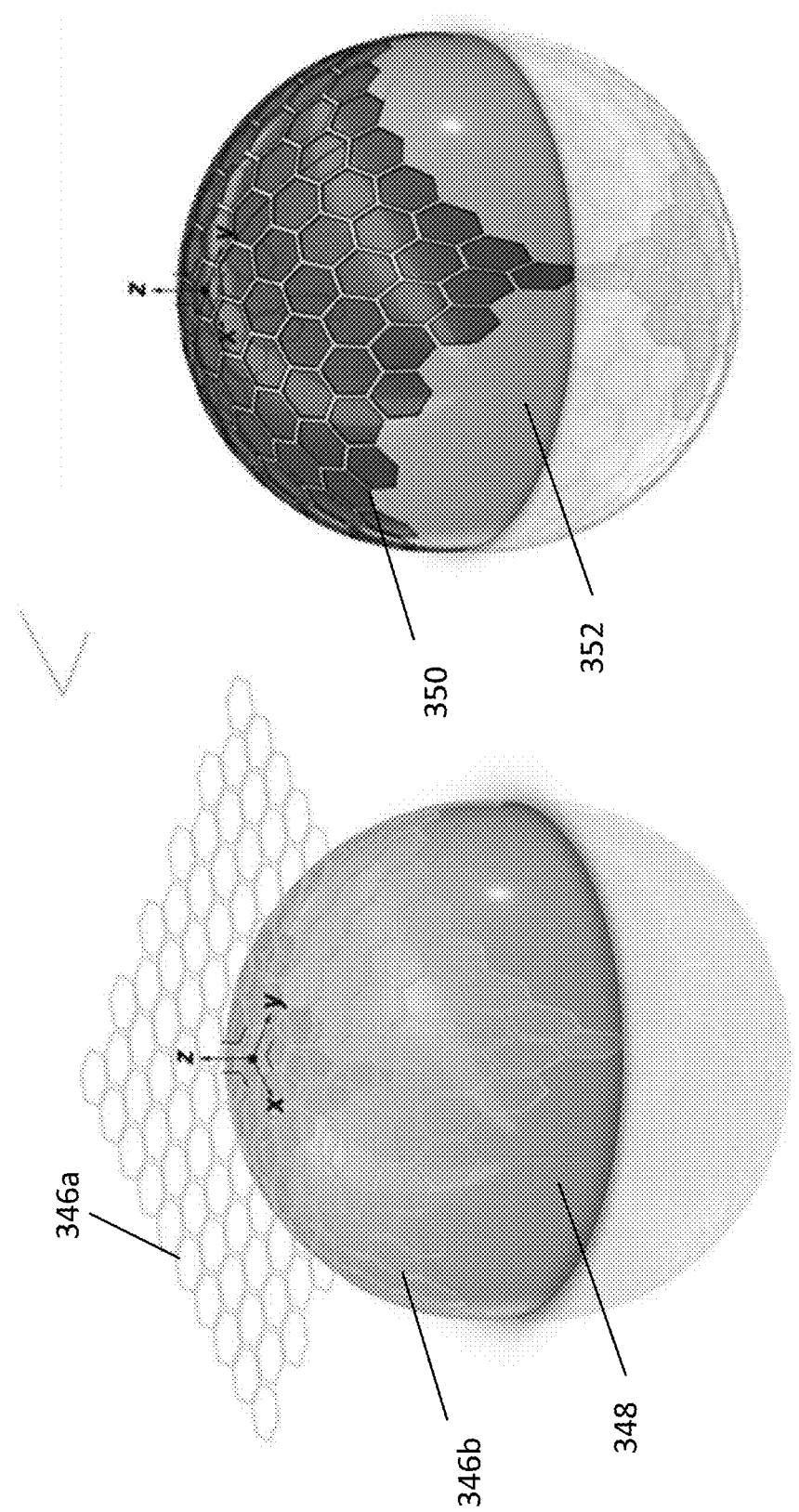

FIG. 3C shows a schematic representation of another exemplary 2D sketch 346a that is an array of hexagonal cells, an exemplary 3D model 348 in the form of a hemisphere that includes a wrapped version 346b of the original 2D sketch 346a. The wrapped version 346b of the 2D sketch wraps around a large part of the outer surface of the hemispherical 3D model 348. It is apparent that, in the illustrated example, the wrapped version 330b of the 2D sketch occupies three dimensions (not just two).

The real-world object, manufactured from the 3D model 348 with the wrapped version 346b of the 2D sketch, is a physical three-dimensional hemisphere 352, on which an array of hexagon shapes 350 are formed that match the array represented by the wrapped version 346b of the 2D sketch on the 3D model 348. In an exemplary implementation, the physical three-dimensional object 352 may have been manufactured with a CNC machine, for example, executing machine instructions generated from the 3D model 348 with the wrapped version 346b of the 2D sketch, directly. Depending on specifications that may have been provided by a design engineer, for example, array of hexagon shapes 350 may have been formed, with the CNC machine for example, by embossing, debossing, or otherwise forming the indicated pattern on object 352.

FIGS. 3B and 3C show where distortion occurs at the extremities of a wrap when using the systems and techniques disclosed herein. Distortion also will happen using the existing approaches where the model is first flattened but those approaches tend to deform the results due to deformation during the flattening and again during the reformation processes. The systems and techniques disclosed herein avoid such double deformations.

Figure 3D:
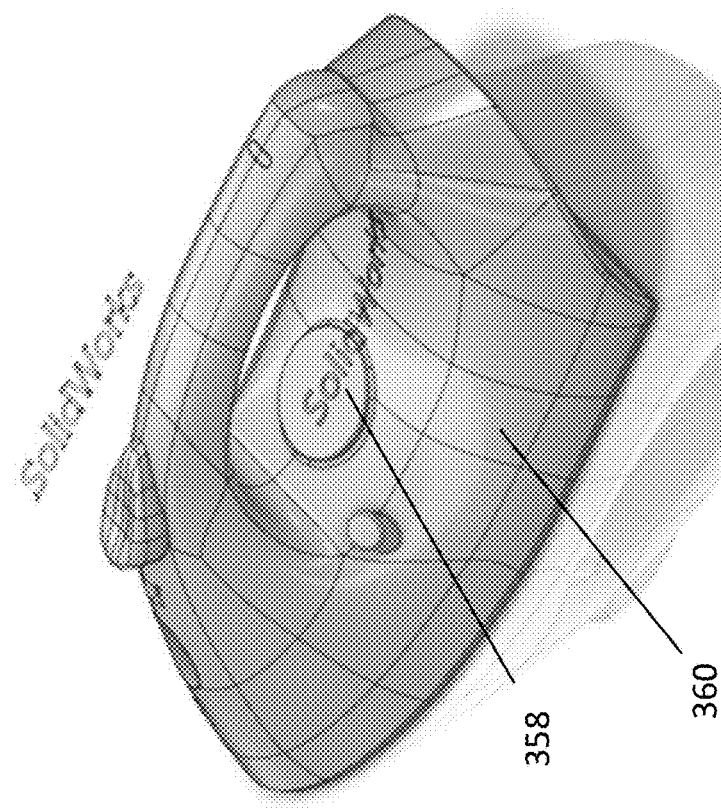
Figure 3D:
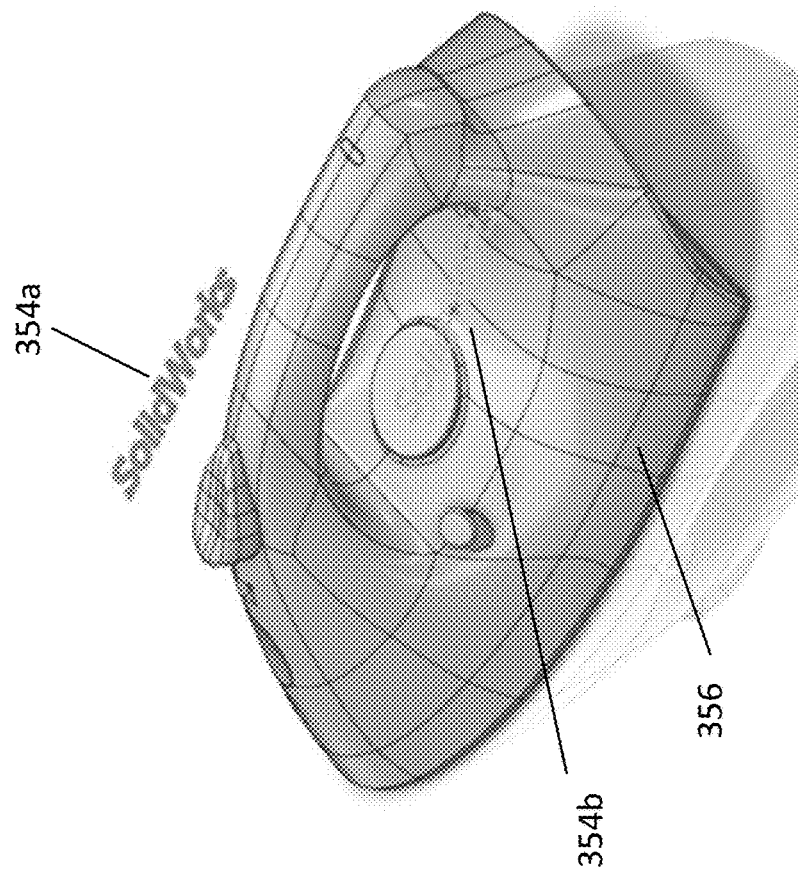

FIG. 3D shows a schematic representation of another exemplary 2D sketch 354*a* that reads "Solidworks," an exemplary 3D model 356 in the shape of an iron (for ironing clothes) with a handle. The 3D model has a wrapped version 354*b* of the original 2D sketch 354*a* on a curved surface of its body just below the handle. The wrapped version 354*b* of the 2D sketch extends along the body of the iron lengthwise, in the same direction of the handle, on the 3D model 356. It is apparent that, in the illustrated example, the wrapped version 354*b* of the 2D sketch occupies three dimensions (not just two).

The real-world object, manufactured from the 3D model 356 with the wrapped version 346*b* of the 2D sketch, is a physical iron-shaped object 360, on which the word "Solidworks" appears, on a curved surface of the object's body, beneath and extending along the handle. In an exemplary implementation, the physical three-dimensional object 352 may have been manufactured with a CNC machine, for example, executing machine instructions generated from the 3D model 356 with the wrapped version 354*b* of the 2D sketch, directly. Depending on specifications that may have been provided by a design engineer, for example, the word "Solidworks" may have been formed on the body, with the CNC machine for example, by embossing, debossing, or otherwise forming the indicated pattern on object.

A virtually endless combination of 2D sketches and 3D models and corresponding physical, real-world objects, with markings or features (e.g., holes, etc.) that correspond to the 2D sketches are possible. In various implementations, the computer 100 may be adapted to show 2D sketches, 3D models (with and/or without a wrapped version of the 2D sketch) on a display screen of the computer 100. In some implementations, these may appear as shown in a manner that is like the way they appear in FIGS. 3A-3D.

Figure 4:
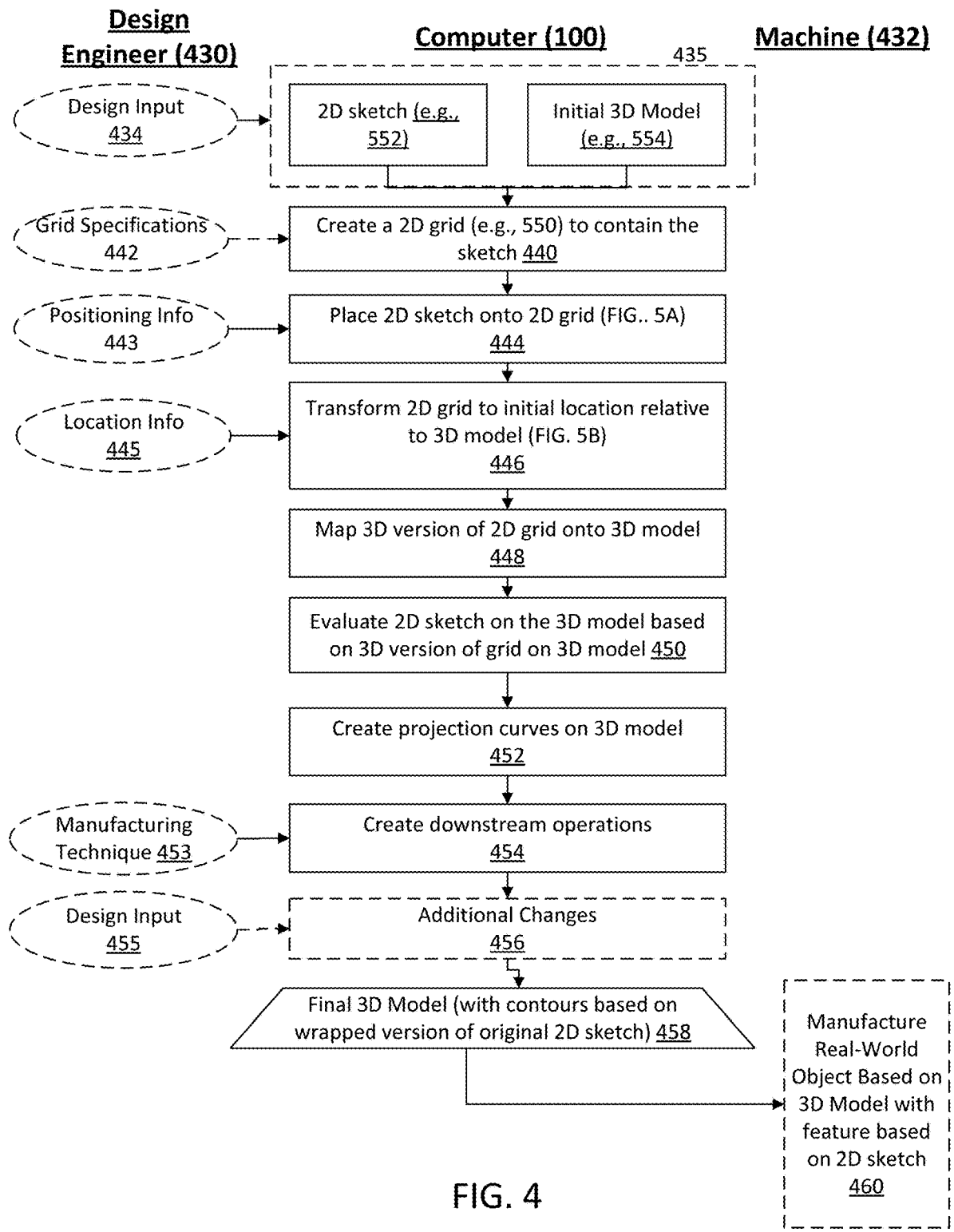
FIG. 4 is a flowchart representing a process of wrapping a 2D sketch onto a 3D model in a computer-implemented environment and then manufacturing a real-world version of the 3D model that includes a wrapped, 3D version of the original 2D sketch.

FIG. 4 is a flowchart representing an implementation of a process for wrapping a two-dimensional (2D) sketch onto a three-dimensional (3D) model of an object. The process includes steps performed by a design engineer 430, a computer 100 configured to perform the functionalities disclosed herein that support wrapping a 2D sketch onto a 3D model of an object, and a machine 432 (e.g., a 3D printer or CNC machine) to manufacture a real-world version of the 3D modeled object with features that correspond to the wrapped image. The computer 100, in a typical implementation, executes CAD software that, when executed by a computer processor, performs the functionalities disclosed herein to wrap or to facilitate wrapping the 2D sketch onto the 3D model of the object in a virtual, computer-based environment. At least some of the process steps may involve interactions between the design engineer 430 (a human user of the computer 100) and the computer 100, and/or between the design engineer 430 and/or the manufacturing machine 432. Most of these interactions are represented with dashed lines in the illustrated figure to emphasize their optional nature.

First, the illustrated process includes creating (at 435), in computer 100, an initial 3D model (e.g., 554 in FIGS. 5A-5H) and a 2D sketch (e.g., 552 in FIGS. 5A-5H). The initial 3D model 554 is a 3D model with one or more surfaces onto which an image corresponding to the 2D sketch can be placed. The 2D sketch 552 is a 2D image that is to be wrapped onto the one or more surfaces of the 3D model. According to the illustrated implementation, the design engineer 430 provides design input (at 434) to the computer 100 to produce the initial 3D model 554 and the 2D sketch. In a typical implementation, the design engineer 430 may perform these functions by interacting with and entering commands into the computer 100 via a CAD-CAM software program, such as SOLIDWORKS®, available from Dassault Systèmes Solidworks Corporation. In such implementations, the initial 3D model 554 may be created using 3D modelling functionalities of a modelling program, such as the aforementioned SOLIDWORKS® program, and the 2D sketch may be created using sketch functionalities available in the same program. In such implementations, the computer 100 creates the 2D sketch 552 and the initial 3D model 554 in response to the design engineer's design input (at 434). In various implementations, the initial 3D model 554 and the 2D sketch 552 may be created in other ways including, for example, by using different computer software programs to create them. In some implementations, the 2D sketch, for example, may be created by scanning an image from a real-world document into the computer 100 from a scanner (not shown in FIG. 3). Other options for creating the initial 3D model 554 and the 2D sketch 552 may be possible.

Next, according to the illustrated flowchart, computer 100 (at 440) generates a virtual, computer-based 2D grid (e.g., 550 in FIG. 5A) to contain the 2D sketch 552. In a typical implementation, the 2D grid 550 consists of a pattern that includes two sets of straight lines, usually crossing each other to form rectangles or squares (e.g., grid cells). The crossing lines in the 2D grid 550 may be arranged so that they cross each other perpendicularly. For example, the grid may include a first set of parallel lines that are perpendicular to, and intersect, a second set of parallel lines. The spacing between each pair of adjacent parallel lines in the 2D grid 550 may be equal to the spacing between every other pair of adjacent parallel lines in the grid. The 2D grid 550 is two dimensional and, therefore, contained entirely with a single plane—i.e., the grid plane. The 2D grid 550 may include any number of grid cells, arranged in an array (e.g., having x rows and y columns, where x and y are any natural numbers). The number of cells, the cell sizes, the cell shapes, the cell density, the number of rows, the number of columns, and the overall size of the 2D grid can vary. In various implementations, one or more (or all) of these grid characteristics (and more) may be controlled or determined based on one or more grid specifications entered into the computer 100 by the design engineer 430 (at 442).

The 2D grid 550 provides a reference framework for locating positions in a single grid plane. Specifically, in this regard, each intersection of lines in the grid serves as a reference point and may be identified (e.g., within the computer) using a 2D Cartesian coordinate system (e.g., of x and y values). In this regard, the 2D grid 550, like the 2D sketch, lies entirely within a single virtual plane and is restricted to two dimensions and two dimensions only, with no portion of the 2D grid 550 extending beyond or outside those two dimensions.

In some implementations, the 2D grid 550 may be generated based on a default set of grid specifications, stored in computer memory, that identify basic grid characteristics (e.g., number and/or size of cells, number of rows, number of columns, etc.). In some implementations, the default set of grid specifications may be a function of dimensions associated with the 2D sketch 552 and/or 3D model 554. In some implementations, the computer 100 is configured to enable a human user to enter grid specifications (at 442) for the 2D grid (specifying, e.g., number and/or size of cells, number of rows, number of columns, etc.) into the computer 100 (e.g., through one or more I/O devices), and to configure the 2D grid 550 according to and based on the user-provided grid specifications. In some implementations, the computer 100 may produce a default grid, as above, and then enable the design engineer 430 to modify or customize the 2D grid 550 by changing one or more grid specifications. In a typical implementation, the density of 2D grid 550 (e.g., the number of grid cells per unit area) can be varied based on the design engineer's grid specifications (provided at 442). Higher grid densities may improve the outcome of the wrapping functionalities in terms of accuracy and quality, but may require more system resources, reducing efficiency of the overall processes.

The 2D grid 550 is adapted to contain the 2D sketch 552 that is to be wrapped onto the initial 3D model 554. This means that the 2D grid 550, of course, is sized (i.e., large enough) to accommodate the 2D sketch 552 in its entirety. Next (at 444), computer 100 places the 2D sketch onto the 2D grid. There are a variety of ways in which the 2D sketch 552 may be placed onto the 2D grid 550. In some implementations, the computer 100 (at 443) enables the design engineer 430 to specify positioning information (e.g., location and/or orientation) for the 2D sketch 552 on the 2D grid 550. In this regard, the computer 100 may enable the design engineer 430 to graphically manipulate the 2D sketch 552 relative to the 2D grid 550. More specifically, the computer 100 may enable the design engineer 430 to select and drag the 2D sketch 552, or portions thereof, onto and/or across the 2D grid 550 until the 2D sketch 552 reaches a desired location and orientation on the 2D grid 550. In other implementations, the computer 100 may enable the design engineer 430 to locate and orient the 2D sketch 552 on the 2D grid 550 by specifying certain numerical parameters (e.g., locations on the 2D grid 550 where one or more points on the 2D sketch 552 should be positioned). In some implementations, the computer 100 may place the 2D sketch 552 onto the 2D grid 550 at a default position (e.g., location and orientation), established by information in computer memory, and enable the design engineer 430 to provide additional input information on positioning (at 443) to change the location and/or orientation of the 2D sketch 552 on the 2D grid 550 from its default position. In some implementations, the computer 100 positions the 2D sketch 552 at a default position on the 2D grid 550 that maximizes the size of the 2D sketch 552 relative to the 2D grid 550. There are a variety of other ways in which the 2D sketch 552 may be placed onto the 2D grid (at 444). For example, in some implementations, the computer finds a center of the input sketch and projects that onto the target face(s). In some alternative implementations, the system may enable a human user to select a point on the sketch to project onto the target face(s).

Figure 5A:
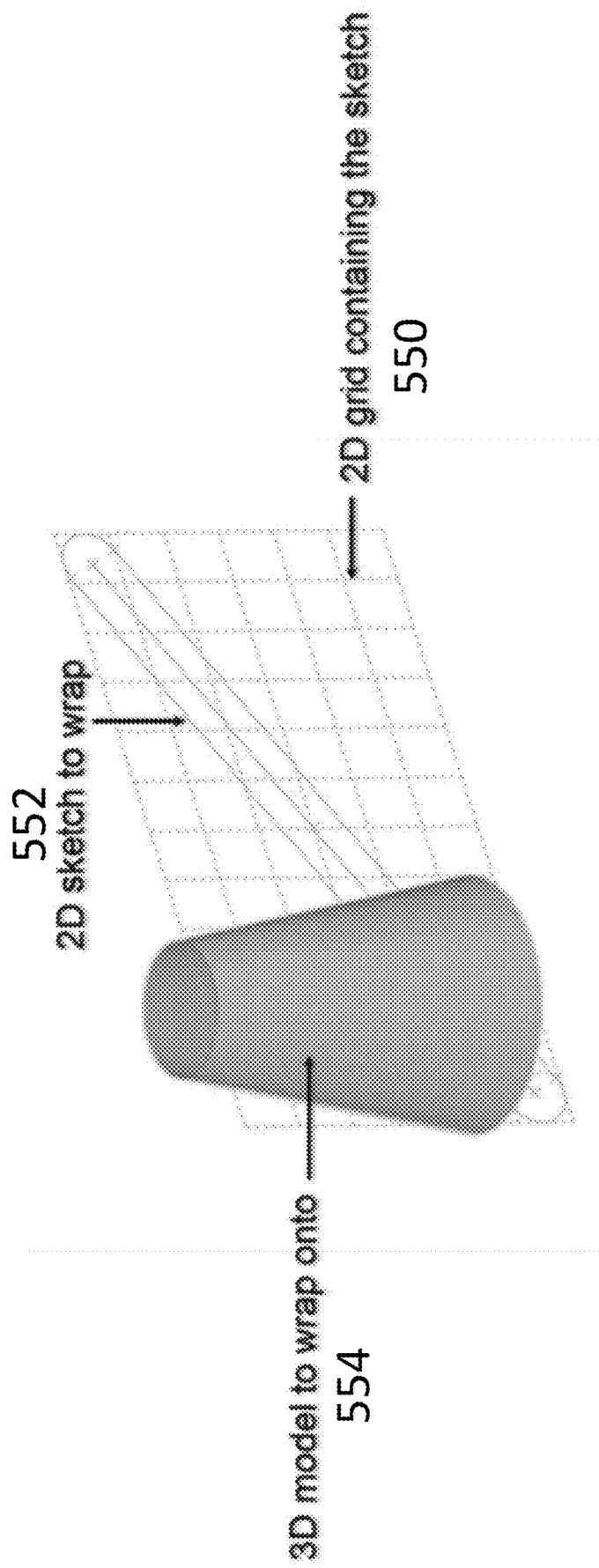

FIG. 5A is an exemplary screenshot that shows a 2D grid 550 next to a 3D model 554, and a 2D sketch 552 on the 2D grid 550. The 2D grid 550 consists of a pattern of straight lines, crossing each other perpendicularly to form a two-dimensional array of squares contained entirely with a single plane—i.e., a grid plane. The 2D sketch 552 is an elongated, two-dimensional, stadium-shaped image and a straight line contained therein that extends along a length of the stadium-shaped image. The 2D sketch 552 lies entirely within the 2D grid 550, with no portion thereof extending beyond the outer edges of the 2D grid 550. Moreover, the 2D sketch 552 extends diagonally across the grid plane from a lower left corner of the 2D grid 550 to an upper right corner of the 2D grid 550. Additionally, the 2D sketch 552 is positioned, in the illustrated example, at a location and orientation that maximizes the size of the 2D sketch 552 relative to the 2D grid 550. In this regard, it can be seen that the 2D sketch 552 extends to (and touches) the outer edges of the 2D grid 550 and that any further scaled expansion of the 2D sketch 552 relative to the 2D grid would cause the 2D sketch to extend beyond at least one of the outer edges of the 2D grid 550. The 3D model 554 in the illustrated example has a frustoconical shape with a flat, circular top and a larger, flat, circular bottom. The 3D model 554 in the illustrated screenshot is next to (but not necessarily touching) the 2D grid 550 or the 2D sketch 552 in the 2D grid 550.

The implementation represented in FIG. 5A illustrates that the 2D grid 550 is large enough to contain the 2D sketch 552 in its entirety. The 2D grid 550 and the 2D sketch 552, moreover, are large enough to wrap around and cover a large portion of the side surface of the frustoconical 3D model. In general, the 2D grid 550 and 2D sketch 552 will be large enough to wrap around and cover any desired 3D surface(s) of the 3D model. It can be appreciated that the 2D grid 550 and the 2D sketch 552 in the illustrated example is large enough to wrap around the entire side surface of the frustoconical 3D model and more. Although the 2D grid 550 in the illustrated example is rectangular, it is feasible that a 2D grid (and or the cells of a 2D grid) could be a different shape (e.g., circular, triangular, pentagonal, etc.) instead of rectangular.

Next (at 446), according to the illustrated flowchart, 2D grid 550 is transformed (or moved) to an initial position (e.g., location and orientation) relative to, and typically in contact with, the 3D model 554. There are a variety of ways in which this step may be performed. In some implementations, the computer 100 places the 2D grid 550 at a default initial position relative to the 3D model 554. The default initial position may be established, for example, based on data stored in computer memory. In some implementations, the computer 100 enables the design engineer 430 to enter location information (at 443) to establish and/or modify the initial position (e.g., location and orientation) of the 2D grid 550 relative to the 3D model 554.

For example, in some implementations, the computer 100 positions the 2D grid at its initial location relative to the 3D model by designating a first point on the 2D grid 550 and a second point on a surface of the 3D model 554 to coincide with (or overlap) one another when the 2D grid is placed at the initial location relative to the 3D model. The 2D grid 550 is then moved to a location where the designated first point on the 2D grid coincides with (e.g., is at the same position as) the designated second point on the surface of the 3D model 554. Moreover, in some implementations, the computer 100 orients the 2D grid 550 relative to the 3D model 554 such that the 2D grid lies in a plane that is tangent to the surface of the 3D model 554 at the designated second point on the surface on the 3D model 554. In some implementations, the 2D grid 550 may be positioned in a plane that touches the designated second point on the surface of the 3D model 554 but that is not tangent (by a designated amount) to the surface of the 3D model at the second point. Additionally, or alternatively, the 2D grid may be angled within the grid plane to a desired angular orientation relative to the 3D model 554. In various implementations, any one or more (or all) of these characteristics that define the initial position of the 2D grid 550 relative to the 3D model 554 (e.g., overlapping first and second points, tangent or angled relative to tangent, angular orientation within the grid plane, etc.) may be determined automatically by the computer in accordance with data stored in memory and/or characteristics of the 2D grid 550 and/or 3D model 554, and/or in accordance with user specified location information 443.

In general, the sketch does not need to be in contact with the target face(s) or the body that contains said face(s). IN a typical implementation, the computer enables the user to define a starting point of the mapping process by picking a reference location (e.g., point/vertex) on the target body and aligning or arbitrarily angling the grid to some entity (e.g., line/edge/plane) using some user-facing control.

In implementations where the computer 100 utilizes user specified location information to position the 2D grid 550 at its initial location relative to the 3D model, the computer 100 may be configured to prompt or enable the design engineer to specify 2D coordinates for the first point on the 2D grid 550 and 3D coordinates for the second point on the 3D model 554, indicate whether the 2D grid should be tangent to the second point on the 3D model 554 or not, and if not, to designate an angle and direction of tilt for the 2D grid relative to tangency, and to designate an angular orientation of the 2D grid within the grid plane.

The coordinates for the first point on the 2D grid may be specified with two dimensions (e.g., an x-axis value and a y-axis value) whereas the coordinates for the second point on the surface of the 3D model may be specified with three dimensions (e.g., an x-axis value, a y-axis value, and a z-axis value). The coordinate system used to specify the two-dimensional coordinates need not be the same coordinate system used to specify the three-dimensional coordinates. For example, the coordinate system used to specify the two-dimensional coordinates can be a coordinate system logically linked to the intersecting lines and cells of the 2D grid 550 itself, whereas the coordinate system used to specific the three-dimensional coordinates can be a coordinate system, within which the 3D model 554 exists. In some implementations, the first point on the 2D grid 550 is not user specified, but is, instead, predetermined by the computer 100. In some implementations, the second point on the 3D model is not user specified, but is, instead, predetermined by the computer 100.

The three-dimensional coordinates for the second point on the 3D model 554 should identify and correspond to a position on or along one of the surfaces of the 3D model. In some implementations, therefore, the computer 100 may be configured to limit the available options for coordinate entry (for the second point on the 3D model 554) to only those coordinates that correspond to points on one of the surfaces of the 3D model 554, while excluding others (e.g., any coordinates that would not touch or lie on one of the surfaces of the 3D model 554).

Ultimately, in a typical implementation, once the necessary characteristics for the initial position of the 2D grid relative to the 3D model have been established (e.g., by the design engineer, the computer 100, or some combination of the two), the computer 100 transforms the 2D grid to the initial location so designated. Once the 2D grid 550 is in its initial position, typically, the 2D grid 550 will be in contact with the 3D model 554. More specifically, when the 2D grid 550 is in the initial position, at least one point on the 2D grid 550 will be at the same location in virtual space as at least one point on the 3D model 554. Moreover, the 2D grid 550 in its initial position is preferably oriented in such a manner that wrapping the 2D grid 550 (which contains the 2D sketch 552) onto the 3D model 554 (e.g., starting from the contact point between the 2D grid 550 and the 3D model 554 and continuing in an outward direction from the contact point) would produce the desired output (i.e., a 3D model, about which the formerly 2D grid and 2D sketch have wrapped in an intended manner).

Figure 5B:
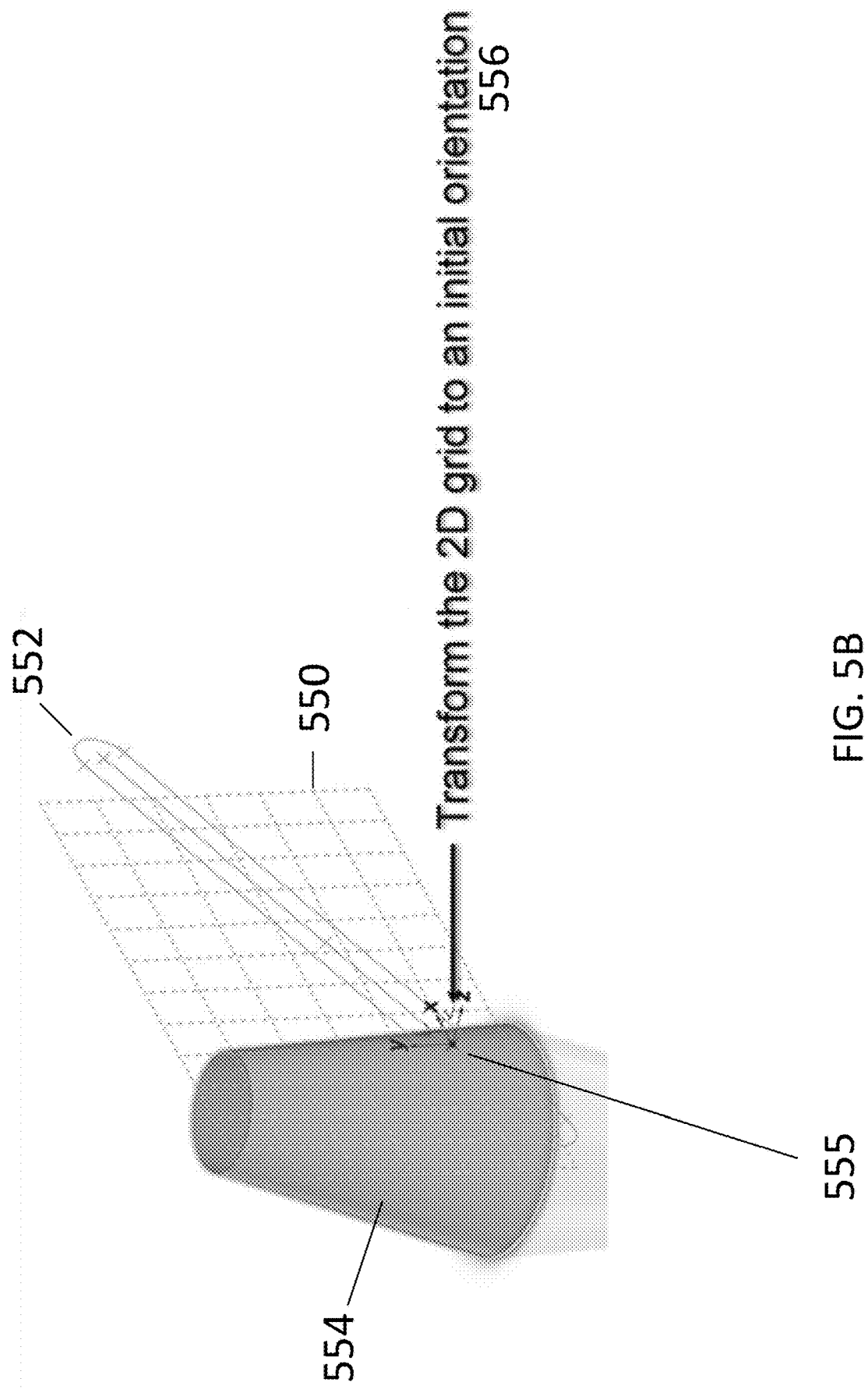

FIG. 5B shows an example of a 2D grid 550 that has been transformed to an initial location (and orientation) relative to a 3D model 554. With the 2D grid 550 so positioned, a first point on the 2D grid 550 coincides with (e.g., touches or occupies the same space as) a second point on the 3D model 554. This point of commonality (or common point 555) appears at the intersection of the three labeled axes, x, y, and z). The labeled axes x, y, and z are parts of a local coordinate frame that the computer defines once the common point 555, which will serve as an initial point to start wrapping the mesh is established. The transformed 2D grid 550 in the illustrated example is oriented relative to the 3D model 554 such that the 2D grid 550 lies in a plane that is tangent to a curve of the surface of the 3D model 554 at the common point 555. Since the 3D model 554 in the illustrated example is frustoconical in shape, the 2D grid 550 is actually in contact with an outer surface of the 3D model in the illustrated example along a line contact that extends on the y-axis from the bottom edge of the 2D grid 550 to the top edge of the curved side surface of the frustoconical 3D model 554.

Once the common point 555 is established, the computer defines the local coordinate frame. In the illustrated example, the local coordinate frame has an origin at the common point 555, an x-axis that is tangent to the surface at the common point 555 and perpendicular to the line contact between the 3D model and the 2D grid, a y-axis that extends along the line contact between the 3D model and the 2D grid, and an z-axis that extends in an outward direction from the surface at the common point 555 perpendicular to the x-axis and to the y-axis. The 2D grid lies entirely within the x-y plane of the local coordinate frame.

The 2D sketch 552 is shown in the illustrated example as being lifted off the 2D grid 550 a small amount. In a typical implementation, the 2D sketch 552 may be on (or at least logically related to) the 2D grid such that there is a direct relationship between the two, with points along the 2D sketch 552 being associated with (and assigned to) specific grid coordinates from the 2D grid 550.

Next (at 448), referring again to the flowchart of FIG. 4, the computer 100 maps a 3D version of the 2D grid onto the 3D model 554. This results in a 3D version of the grid mapped and wrapped around at least a portion of the 3D model. There are a variety of ways in which the computer 100 can perform this function. One exemplary implementation can be understood by referring to FIG. 5C and FIG. 5D.

Figure 5C:
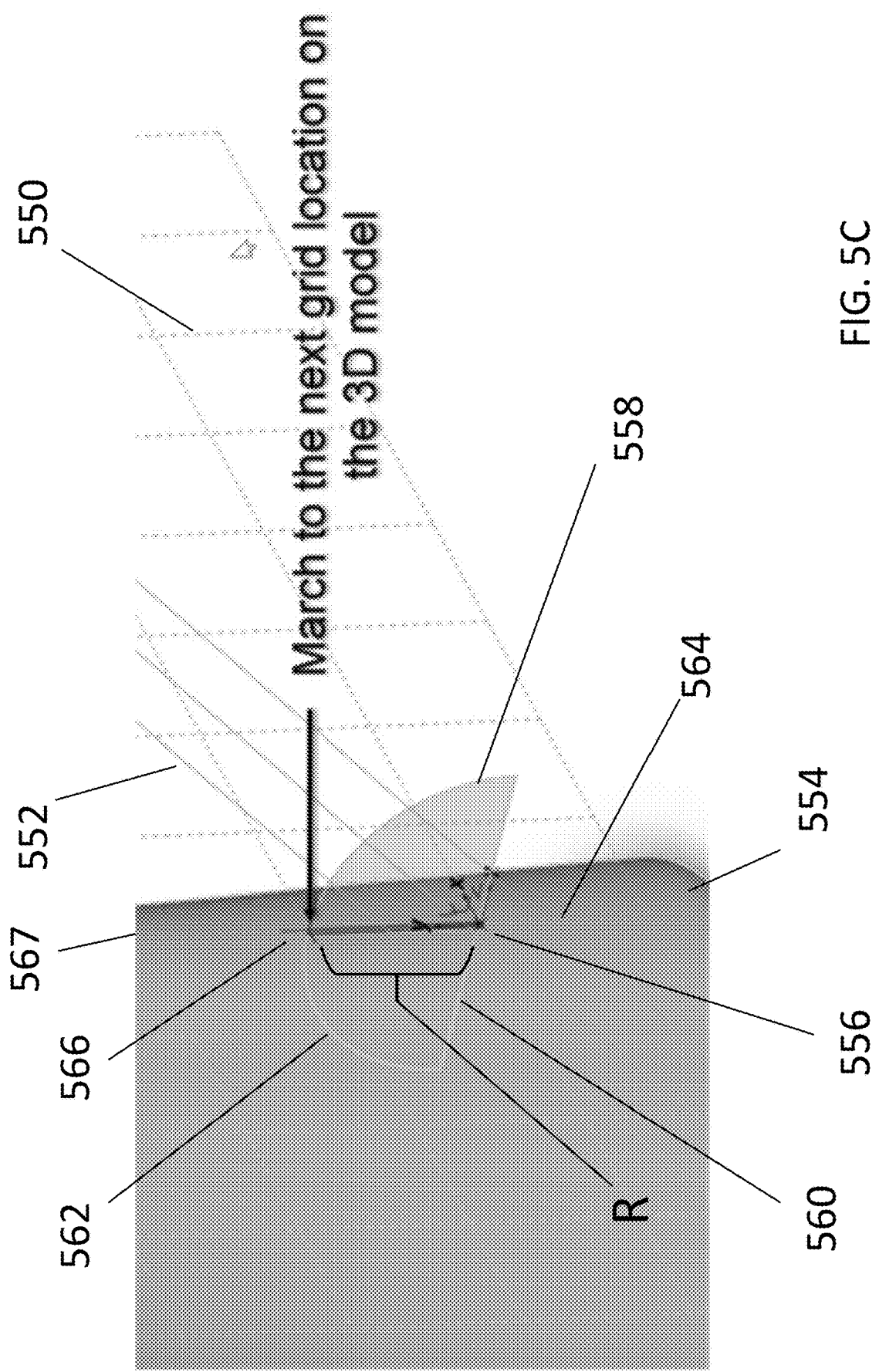

According to FIG. 5C, computer 100 designates a starting point 556 for the mapping process. The starting point 556, according to the illustrated example, is a location (which may be defined by a set of coordinates in the local coordinate frame, as 0, 0, 0, for example) on the 2D grid. In one example, the starting point may be the first point on the 2D grid 550 that touches or coincides with the second point on the 3D model 554. Coinciding suggests that the two points are very close to one another. For example, the first point on the 2D grid 550 may coincide with the second point on the 3D model 554 if the first point on the 2D grid 550 is closer to the second point on the 3D model 554 than any other point on the 2D grid 550. The computer 100, in a typical implementation, designates this starting point 556 as a first intersection (definable by 3D coordinates) in the 3D version of the grid being created. The computer 100 may then create a logical mapping (e.g., in computer memory) between this first intersection point 556 are the corresponding point from the 2D grid 550.

From the designated starting point 556, computer 100 intersects the 3D model 554 with an intersecting shape (e.g., a semi-circular disk 558) as shown in FIG. 5C. The semi-circular disk 558 in the illustrated example has a radius (R) that may be equal to the distance between adjacent parallel lines in the 2D grid 550. The semi-circular disk 558 has a straight base portion 560 (with a length of 2R) and an arc portion 562 that extends in an upward and curved, semi-circular fashion from each of the two opposite ends of the base portion 560. The semi-circular disk 558 intersects the 3D model 554 along a first axis (e.g., the y-axis) of the local reference frame. Moreover, base 560 of the semi-circular disk 558 lies along a second axis (e.g., the z-axis) of the local reference frame. The arc portion 562 of the semi-circular disk 558 passes through a surface of the 3D model 554 at point 566 above the first intersection point 556. Computer 100 designates this higher point 566 as a second intersection (definable by 3D coordinates) in the 3D version of the grid being created. The computer 100 may create a logical association (e.g., in memory) mapping this second intersection point 566 to the corresponding point from the 2D grid 550.

The computer 100 then marches one step forward to repeat the foregoing process, this time again intersecting the 3D model 554 with a semi-circular disk (having the same dimensions as 558) along the first axis (e.g., the y-axis) of the local reference frame, this time with the base 560 of the semi-circular disk 558 extending out from the 3D model 554 in a direction normal to the surface of the 3D model at point 566, and the arc portion 562 of the semi-circular disk 558 passing through the surface of the 3D model 554 at another point 567 above the second intersection point 566. Computer 100 designates this even higher point 567 as a third intersection (definable by 3D coordinates) in the 3D version of the grid being created. Computer 100 may create a logical association (e.g., in memory) mapping this third intersection point 566 to the corresponding point from the 2D grid 550.

The computer 100 continues in this manner to march up the side of the 3D model with a sequence of intersections that lead to marking and mapping additional intersection point on the 3D model, with each marked intersection point being mapped to a corresponding one of the points from the original 2D grid 550.

Figure 5D:
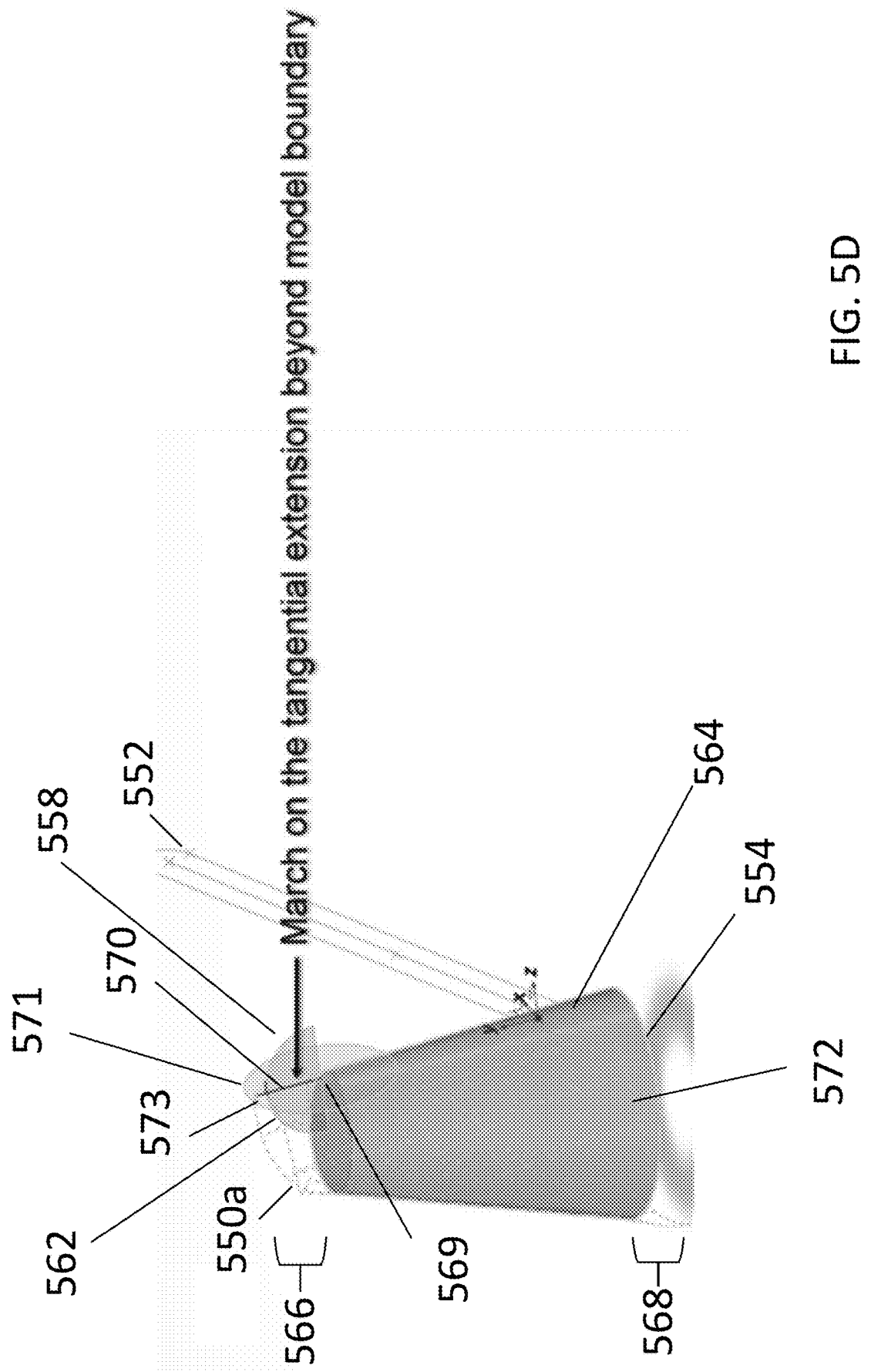

When the computer 100 reaches the end of the surface being intersected (e.g., the top of 3D model in the illustrated example), the computer 100 may march beyond that edge onto a linear, tangential extension 571 of the surface beyond the model boundary. This is represented in FIG. 5D, which shows a computer-generated tangential extension 571 (in the form of a flat circle, whose midpoint is at the upper edge of the model boundary) that extends beyond the model boundary at an upper edge of its frustoconical shape. The tangential extension 471 is tangential to the surface of the 3D model (e.g., along the y-axis at the upper edge of the 3D frustoconical model). The tangential extension 571, although shown in the figure, is not part of the 3D model. Instead, it is merely a virtual reference that allows the marching intersections to continue past the model boundary. CAD software, such as the SOLIDWORKS program, can generate such tangential extensions. The computer 100 typically calls such functionality to generate a tangential extension 571 that is large enough to facilitate additional marching to whatever extent may be required to accommodate one marked and mapped intersection for each intersection in the original 2D grid 550.

As shown in FIG. 5D, the computer 100 intersects the tangential extension 571 with semi-circular disk 558 in FIG. 5D, along the same first axis (e.g., the y-axis) of the local reference frame. The base 560 of the semi-circular disk 558 is extending out from the tangential extension 571 at a previously marked and mapped point 569 of intersection and in a direction that is normal to a surface of the flat tangential extension 571. The arc portion 562 of the semi-circular disk 558 is passing through the flat tangential extension 571 at yet another point 573 that is above the previously marked point 569. Computer 100 designates this additional point 573 as another intersection (definable by 3D coordinates) in the 3D version of the grid being created. Computer 100 may then create a logical association (e.g., in memory) mapping this additional intersection point 573 to the corresponding point from the 2D grid 550.

Thus, the computer 100 is configured to march along the 3D model 554 in a first direction that corresponds to a first axis (e.g., the y-axis) of the original 2D grid 550. FIG. 5E shows that the computer 100, in a typical implementation, the computer 100 is configured to march in a second direction that is different than the first direction. For example, the computer 100 in FIG. 5E is shown taking one marching step in a direction that corresponds to a second axis (e.g., the y-axis) of the original 2D grid 550.

In FIG. 5E, computer 100 intersects the 3D model 554 with a semi-circular disk 558 that has a radius (R) that may be equal to the distance between adjacent parallel lines in the 2D grid 550. The semi-circular disk 558 has a straight base portion 560 (with a length of 2R) and an arc portion 562, all of which lies in the x-z plane of the local reference frame. The arc portion 562 of the semicircular disk 558 is curved and extends from each of the two opposite ends of the base portion 560. The straight base portion 560 of the semicircular disk 558 extends through a surface of the 3D model at a first point 575 (e.g., a previously marked and mapped grid intersection point on the 3D model 554). The arc portion 562 of the semicircular disk 558 passes through the surface of the 3D model at an additional point 577 displaced as indicated from the first point 575. Computer 100 designates this additional point 577 as yet another intersection point (definable by 3D coordinates) in the 3D version of the grid being created. The computer 100 may create a logical association (e.g., in memory) mapping this additional intersection point 577 to the corresponding point from the 2D grid 550.

In a typical implementation, the computer 100 marches around the 3D model 554 in the foregoing manner, sequentially marking and mapping intersection points for a 3D wrapped version of the original 2D grid 550 on the 3D model 554. The computer 100 continues this process in a typical implementation until all the intersections from the original 2D grid 550 have a corresponding intersection point marked and mapped in the 3D model 554.

Next (at 450), in the flowchart of FIG. 4, the computer evaluates (or determines a configuration for) the 2D sketch on the 3D model based on the 3D version of the grid (or 3D mesh surface) just created. In a typical implementation, the 2D sketch curves are evaluated on the 3D mesh surface using the same parameterization. Thus, the computer 100, in a typical implementation, defines parameters for a wrapped version of the 2D sketch on the wrapped 3D version of the grid based on the mapped relationship between the marked intersections of the wrapped 3D version of the grid and the original 2D grid. Consider, for example, that the 2D sketch is defined on a planar surface and the planar surface is a function of u and v, (i.e., f(u, v)). The 3D version of the grid is also used to create a mesh-of-points surface, g(u, v). Therefore, a point on plane f(u, v) and be transformed into g(u, v) with the same parameters. Finally, 2D curves on the sketch can be created on the 3D grid with the same f(u, v) to g(u, v) transformation. Computer 100 thereby creates a set of curves on the wrapped 3D version of the grid that correspond to the 2D sketch curves on the original 2D grid. More specifically, the computer 100 generates the curves on the wrapped 3D version of the grid with positioning relative to the marked intersection points of the wrapped 3D version of the grid that is based on positioning of the 2D sketch curves relative to the corresponding intersection points on the 2D grid. The resulting curves 557 on the wrapped 3D version of the grid thus produced by the computer 100 are near (i.e., very close to) or on the 3D model.

Figure 5F:
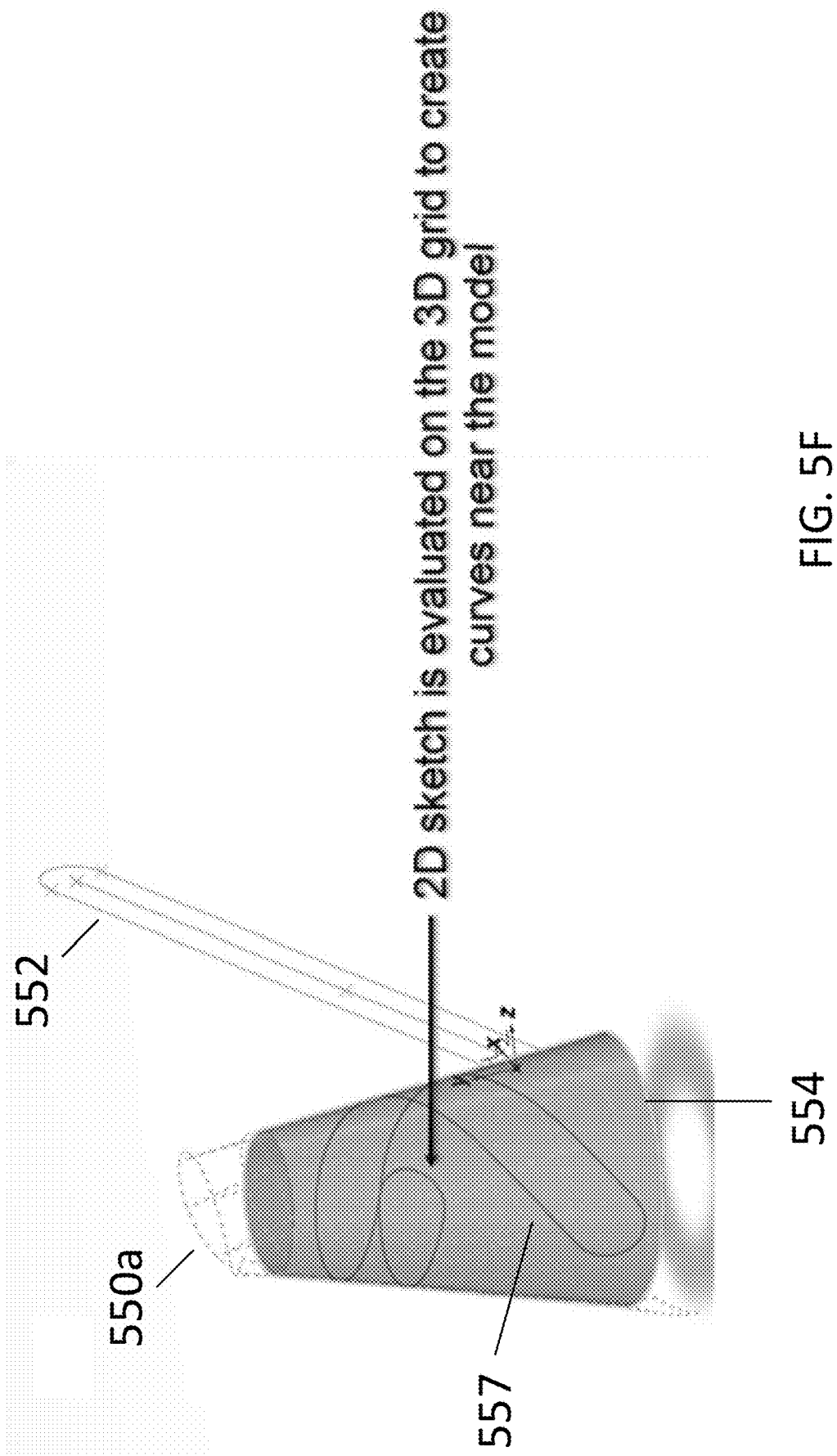

FIG. 5F shows an example of a 3D model 554, with a 3D version 550a of a grid wrapped around the 3D model 554, a visual representation of an original 2D sketch 552, and a set of 3D curves on the 3D wrapped version 550a of the grid near the 3D model 554 that correspond to the original 2D sketch.

Figure 5G:
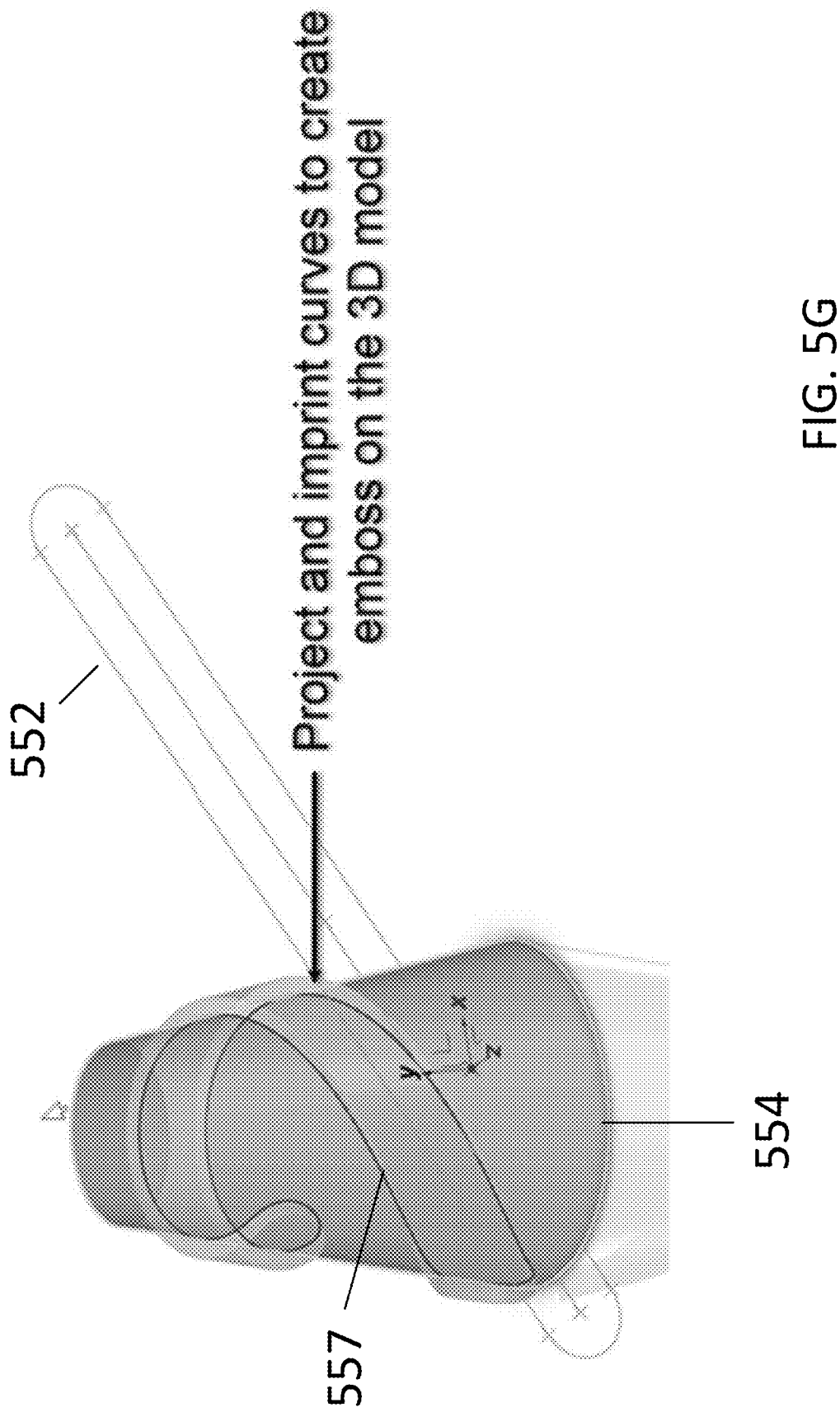

Next (at 452), according to the flowchart of FIG. 4, computer 100 creates curves on the actual 3D model 544 itself (e.g., based on the set of 3D curves 557 previously created on the 3D wrapped version 550a of the grid near the 3D model 554, which correspond to the original 2D curves from the original 2D sketch). There are a variety of ways in which the computer 100 may create the curves on the actual 3D model itself. In some implementations, the computer 100 utilizes directional or orthogonal projection to project the curves 557 from the 3D wrapped version of the grid down onto the 3D model 554 itself. An example of this is represented in FIG. 5G, which shows a set of curves 557 (e.g., from a 3D wrapped version of a grid) being projected down onto a 3D model 554 to define a set of curves on the 3D model 554 that correspond to the projected set of curves 557. The computer 100 makes the set of curves so defined become part of the 3D model 554 so that they can be produced as part of a real-world version of the 3D model and appear on corresponding surface of the real-world version of the 3D model.

The manufacturing technique for forming the surfaces of the real-world version of the 3D model may include scribing, embossing, debossing, and/or otherwise forming. The manufacturing technique to be utilized may be suggested or designated by the computer 100 or specified by the design engineer 430 (at 453) to cause the computer 100 to create downstream operations (at 454) for the real-world object to be manufactured.

Figure 5H:
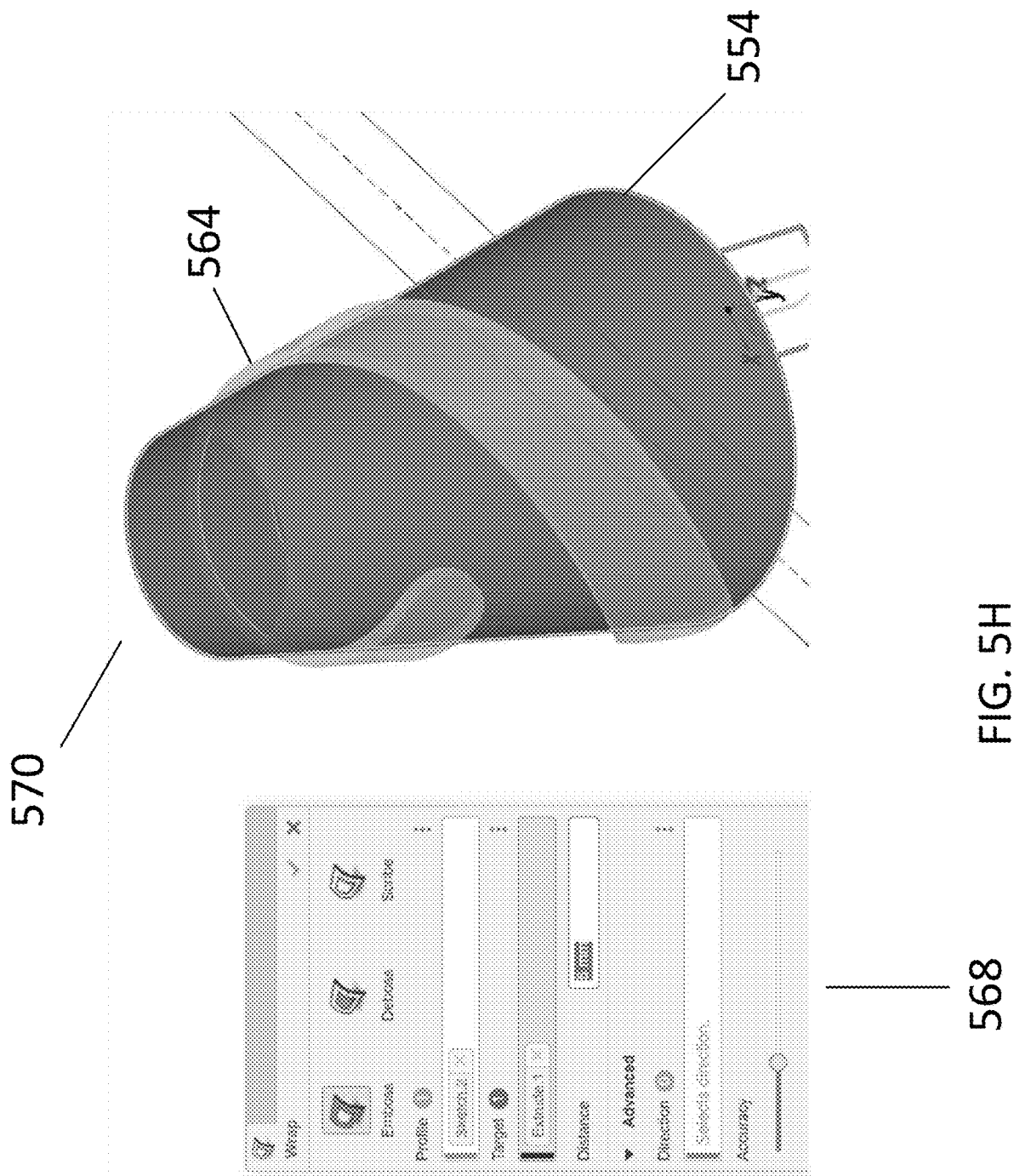

FIG. 5H shows a partial screenshot that includes a 3D model 554 having a 3D version of a previously-2D sketch wrapped around it. The screenshot includes a dialog box 568 on a user interface that presents three options for manufacturing the wrapped sketch feature 564 on a real-world version of the 3D model. These manufacturing technique options include emboss, deboss, and scribe and each option is user selectable (e.g., by the design engineer at 453). The dialog box 568 enables the design engineer to specify the profile ("sketch.2" in the illustrated example) to which the manufacturing technique will apply, and the applicable target ("extrude.1" in the illustrated example). The dialog box 568 enables the design engineer to specify a distance ("5 mm" in the illustrated example) that the wrapped feature will extend outward. The dialog box 568 also enables the design engineer to specify a degree of accuracy. In an exemplary implementation, the degree of accuracy defines the size of the grid (e.g., the marching step) used to map the sketch onto the target. The larger the step, the less accurate the result might be. The dialog box 568 is but one example of a dialog box 568 that may be shown to a design engineer to enable the design engineer to specify manufacturing techniques, with associated manufacturing details, for the wrapped sketch feature 564.

The computer 100 saves the design engineers selections made within dialog box 568 together with the modified 3D model 570 (now having a wrapped sketch feature 564). In a typical implementation, these selections are later used to guide or direct the manufacturing of a real-world version of the modified 3D model 570.

Referring again to the flowchart of FIG. 4, the computer 100 (at 456) may make additional changes to the modified 3D model 570. These changes may be based on additional design input 455 that the design engineer 430 enters into the computer 100. The changes could be to any part of the modified 3D model or could add onto the modified 3D model.

Ultimately, the process results in a final 3D model (at 458) that includes contours based on a wrapped version of the original 2D sketch. This final 3D model may be used to create machine instructions and/or operational inputs for one or more real-world machines (e.g., additive technology machine(s), such as a 3D printer) to manufacture a real-world version of the object represented in the final 3D model. In a typical implementation, a machine operator may review the final 3D model and provide operational inputs to one or more real-world manufacturing machines to produce the real-world version of the modelled object. In some implementations, the computer 100 may generate machine executable instructions that get fed directly into the manufacturing machine(s) to manufacture the real-world version of the modelled object (at 460).

A number of embodiments of the invention have been described. Nevertheless, it will be understood that various modifications may be made without departing from the spirit and scope of the invention.

For example, the techniques and systems disclosed herein can be adapted to wrap virtually any kind of pattern from a 2D sketch onto virtually any kind of 3D model. The sketch can be primarily or entirely aesthetic or can represent a functional element of the object in the 3D model. Surfaces that correspond to the wrapped sketch may be designed into and formed on the resulting real-world object in any number of a variety of possible ways that would result in a pattern corresponding to the wrapped sketch being visible and formed upon one or more surfaces of the resulting real-world object. Inscribing, embossing, and debossing the pattern are some possibilities that are mentioned specifically herein. However, surfaces corresponding to the wrapped sketch may be formed in any convenient manner.

In some implementations, the computer provides additional options to the user for creating the wrapped image on the 3D real-world object. These may include, for example, Trace and/or Surface. Trace will trace the edges of the wrap similar to what Scribe does but will not affect the target face(s). It will instead create a series of 3D curves approximating the intersection of the wrapped sketch and target face(s). Surface will create a surface body filling in the region(s) created by the traced curves and will not affect the target face(s).

The real-world object that gets manufactured based on the 3D model having curves that correspond to the wrapped version of the originally-2D sketch can be manufactured using any one of a variety of different manufacturing techniques or combinations of techniques. In some implementations, the real-world object may be manufactured using additive technology, such as 3D printing. Other variations, including CNC machines, are possible.

In a typical implementation, the process disclosed herein includes creating a 2D grid to contain the sketch. In some implementations, the density (e.g., cells per unit of area) of the 2D grid can be customized or specified by the design engineer. Using a denser grid tends to improve the accuracy of the transformation but tends to increase the time required to generate the results. Using a less dense grid tends to reduce the accuracy of the transformation but tends to reduce the amount of time required to generate the results. It is expected that design engineers may employ less dense grids for one or more initial passes to verify the results are close to expectations, and then tweak (e.g., increase) the grid density and adjust other available settings to obtain a desired result.

Once the 2D grid has been created, the 2D grid is transformed to an initial location on the 3D model. In some implementations, the initial location can be set based on a user specified coordinate axis system or a nearest point to the model (e.g., with the grid being used to project a point at the center of the grid onto a target face or intersection with a target face and from there the sketch is mapped onto the target face(s)). This may enable the user to customize the result for several different wrap operations using the same baseline sketch.

After an initial location is established, a marching algorithm will start to locate all other mesh points on the 3D model by intersecting a semi-circular disk with the 3D model. In a typical implementation, this preserves the original grid length along the intersection curve to avoid or at least minimize distortion. In other implementations, the shape of the intersecting member could be something other than a semicircle.

After the 2D sketch is evaluated on the 3D grid, the curves may be created on the 3D model by any one of several types of projection including, for example, orthogonal or directional projection. Downstream operations such as scribe, emboss, deboss, etc., are created from the projection curves.

The systems and techniques disclosed herein (including transformation and the marching algorithm) can be applied to any geometry without limitation. The target geometry, for example, can be or include primitives or general B-Spline models.

The phrase computer-aided design or computer-aided design environment should be construed broadly to include or involve any computer-based systems or techniques for designing, engineering, simulating, or viewing designs with one or more computers or computer-based components.

In various implementations, certain computer components disclosed herein (e.g., applications, design tools, etc.) can be implemented by one or more computer-based processors (referred to herein as a processor) executing computer-readable instructions stored on non-transitory computer-readable medium to perform the associated computer-based functionalities (e.g., the functionalities represented in FIG. 4 and attributable to the computer). The one or more computer-based processors can be virtually any kind of computer-based processors and can be contained in one housing or distributed at different locations, and the non-transitory computer-readable medium can be or include any one or more of a variety of different computer-based hardware memory/storage devices either contained in one housing or distributed at different locations.

Certain functionalities are described herein as being accessible or activated by a user selecting an onscreen button or the like. This should be construed broadly to include any kind of visible, user-selectable element or other user interactive element.

The systems and techniques disclosed herein can be implemented in a number of different ways. In one exemplary implementation, the systems and techniques disclosed herein may be incorporated into the SOLIDWORKS® computer program available from Dassault Systèmes Corporation. In various implementations, the systems and techniques can be deployed otherwise.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification (e.g., aspects of those represented in FIG. 4 and attributable to the computer and others disclosed herein) can be implemented as operations performed by a data processing apparatus (e.g., a processor/specially programmed processor/computer) on data stored on one or more computer-readable storage devices or received from other sources, such as the computer system and/or network environment described herein. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other implementations are within the scope of the claims.

What is claimed is:

1. A computer-based method of wrapping a two-dimensional (2D) sketch onto a three-dimensional (3D) model, the method comprising:
    placing the 2D sketch onto a 2D grid;
    transforming the 2D grid to an initial location relative to the 3D model;
    mapping the 2D grid onto the 3D model to produce a 3D grid wrapped around the 3D model;
    evaluating the 2D sketch onto the 3D grid to produce a 3D image wrapped around the 3D model, wherein the 3D image wrapped around the 3D model corresponds to the 2D sketch; and
    creating one or more curves on the 3D model by projecting the 3D image onto the 3D model.

2. The computer-based method of claim 1, wherein mapping the 2D grid onto the 3D model to produce the 3D grid on the 3D model comprises:
    applying a marching algorithm to the 3D model to map the 2D grid onto the 3D model one grid at a time.

3. The computer-based method of claim 2, wherein the marching algorithm comprises:
    identifying a first point on the 2D grid;
    intersecting the 3D model with a first 2D intersecting shape, wherein the first 2D intersecting shape comprises:
        a first edge that extends through the first point on the 2D grid and through a first point on the 3D model; and
        a second edge that extends through the 3D model at a second point on the 3D model; and
    designating, in computer memory, the first point on the 3D model as a first intersecting point for the 3D grid.

4. The computer-based method of claim 2, wherein applying the marching algorithm to the 3D model to map the 2D grid onto the 3D model one grid at a time comprises:
    generating a tangential extension at an edge of the 3D model if any grid intersection of the 2D grid would extend beyond the edge of the 3D model when wrapped around the 3D model.

5. The computer-based method of claim 4, further comprising:
    intersecting the tangential extension with a third 2D intersecting shape that comprises a tangential extension edge that extends through a point on the tangential extension; and
    designating, in computer memory, the point on the tangential extension as another intersecting point for the 3D grid.

6. The computer-based method of claim 3, further comprising:
    designating, in computer memory, the second point on the 3D model as a second intersecting point for the 3D grid.

7. The computer-based method of claim 6, wherein the 2D intersecting shape is a semicircular disk that extends between the first point and the second point along a first axis of the 2D grid.

8. The computer-based method of claim 6, further comprising:
    intersecting the 3D model with a second 2D intersecting shape, wherein the second 2D intersecting shape comprises:
        a first edge that extends through the second point on the 3D model; and
        a second edge that extends through a third point on the 3D model; and
    designating, in computer memory, the third point on the 3D model as a third intersecting point for the 3D grid.

9. The computer-based method of claim 7, wherein the semicircular disk lies entirely within a plane that is normal to a surface of the 3D model at the first point and/or the second point.

10. The computer-based method of claim 7, wherein the semicircular disk has a radius that is equal to a cell height or width of the 2D grid.

11. The computer-based method of claim 10, wherein the second 2D intersecting shape extends between the first point and the second point along a second axis of the 2D grid that is orthogonal to the first axis of the 2D grid.

12. The computer-based method of claim 1, wherein evaluating the 2D sketch onto the 3D grid to produce the 3D image wrapped around the 3D model comprises using a same parameterization for the 3D image wrapped around the 3D model as the 2D sketch.

13. The computer-based method of claim 1, wherein the one or more curves are created on the 3D model by projecting the 3D image onto the 3D model with orthogonal projection or directional projection.

14. The computer-based method of claim 1, further comprises:
    designating a downstream operation to manufacture the one or more curves in a real-world manufactured version of the 3D model from the one or more curves.

15. The computer-based method of claim 14, wherein designating the downstream operation to manufacture the one or more curves in a real-world manufactured version of the 3D model from the one or more curves comprises:
    presenting, on a computer display, a plurality of user-selectable options for manufacturing the one or more curves in the real-world manufactured version of the 3D model; and
    receiving a user selection; and
    in response to receiving the user selection, designating the option associated with the user selection as the downstream operation to manufacture the one or more curves in a real-world manufactured version of the 3D model from the one or more curves.

16. The computer-based method of claim 15, wherein the plurality of user-selectable options comprise scribing, embossing, and debossing.

17. The computer-based method of claim 15, further comprising:
manufacturing the real-world version of the 3D model having the one or more curves, using the designated downstream operation to produce the one or more curves on the real-world version of the 3D model.

18. The computer method of claim 1, wherein the 3D grid wrapped around the 3D model is a 3D version of the 2D grid and is three dimensional merely by virtue of the 2D grid bending into a third dimension.

19. A computer system comprising:
a computer processor; and
computer-based memory operatively coupled to the computer processor, wherein the computer-based memory stores computer-readable instructions that, when executed by the computer processor, cause the computer-based system to wrap a two-dimensional (2D) sketch onto a three-dimensional (3D) model with a process comprising:
placing the 2D sketch onto a 2D grid;
transforming the 2D grid to an initial location relative to the 3D model;
mapping the 2D grid onto the 3D model to produce a 3D grid wrapped around the 3D model;
evaluating the 2D sketch onto the 3D grid to produce a 3D image wrapped around the 3D model, wherein the 3D image wrapped around the 3D model corresponds to the 2D sketch; and
creating one or more curves on the 3D model by projecting the 3D image onto the 3D model.

20. The computer system of claim 19, wherein mapping the 2D grid onto the 3D model to produce the 3D grid on the 3D model comprises:
applying a marching algorithm to the 3D model to map the 2D grid onto the 3D model one grid at a time.

21. The computer system of claim 20, wherein applying the marching algorithm to the 3D model to map the 2D grid onto the 3D model one grid at a time comprises:
generating a tangential extension at an edge of the 3D model if any grid intersection of the 2D grid would extend beyond the edge of the 3D model when wrapped around the 3D model.

22. The computer system of claim 21, further comprising:
intersecting the tangential extension with a third 2D intersecting shape that comprises a tangential extension edge that extends through a point on the tangential extension; and
designating, in computer memory, the point on the tangential extension as another intersecting point for the 3D grid.

23. The computer system of claim 19, wherein the 3D grid wrapped around the 3D model is a 3D version of the 2D grid and is three dimensional merely by virtue of the 2D grid bending into a third dimension.

24. A non-transitory computer readable medium that has stored thereon computer-readable instructions that, when executed by a computer-based processor, cause the computer-based processor to perform a process comprising:
placing a 2D sketch onto a 2D grid;
transforming the 2D grid to an initial location relative to a 3D model;
mapping the 2D grid onto the 3D model to produce a 3D grid wrapped around the 3D model;
evaluating the 2D sketch onto the 3D grid to produce a 3D image wrapped around the 3D model, wherein the 3D image wrapped around the 3D model corresponds to the 2D sketch; and
creating one or more curves on the 3D model by projecting the 3D image onto the 3D model.

25. The non-transitory computer readable medium of claim 24, wherein mapping the 2D grid onto the 3D model to produce the 3D grid on the 3D model comprises:
applying a marching algorithm to the 3D model to map the 2D grid onto the 3D model one grid at a time.

26. The non-transitory computer readable medium of claim 24, wherein applying the marching algorithm to the 3D model to map the 2D grid onto the 3D model one grid at a time comprises:
generating a tangential extension at an edge of the 3D model if any grid intersection of the 2D grid would extend beyond the edge of the 3D model when wrapped around the 3D model.

27. The non-transitory computer readable medium of claim 26, further comprising:
intersecting the tangential extension with a third 2D intersecting shape that comprises a tangential extension edge that extends through a point on the tangential extension; and
designating, in computer memory, the point on the tangential extension as another intersecting point for the 3D grid.

28. The non-transitory computer-readable medium of claim 24, wherein the 3D grid wrapped around the 3D model is a 3D version of the 2D grid and is three dimensional merely by virtue of the 2D grid bending into a third dimension.

\* \* \* \* \*